(12) United States Patent
Kimura et al.

(10) Patent No.: US 6,521,031 B2
(45) Date of Patent: Feb. 18, 2003

(54) COLORING COMPOSITION, INK-JET INK, AND INK JET RECORDING METHOD

(75) Inventors: Keizo Kimura, Kanagawa (JP); Takayuki Ito, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 96 days.

(21) Appl. No.: 09/800,779

(22) Filed: Mar. 8, 2001

(65) Prior Publication Data

US 2001/0045176 A1 Nov. 29, 2001

(30) Foreign Application Priority Data

Mar. 29, 2000 (JP) ........................................ 2000-090913
Dec. 8, 2000 (JP) ........................................ 2000-374467

(51) Int. Cl.⁷ .......................... C09D 11/02; C09B 23/00
(52) U.S. Cl. ................... 106/31.47; 106/31.46; 106/31.49; 8/659
(58) Field of Search ................ 106/31.47, 31.49, 106/31.46; 8/659; 544/224, 238; 546/183, 195, 200, 223; 548/454, 467, 486

(56) References Cited

U.S. PATENT DOCUMENTS

| 5,753,017 | A  | * | 5/1998 | Onodera et al. | ......... | 106/31.47 |
| 6,383,276 | B1 | * | 5/2002 | Yamakawa et al. | ...... | 106/31.49 |
| 2002/0007762 | A1 | * | 1/2002 | Arakawa | ................. | 106/31.27 |
| 2002/0017217 | A1 | * | 2/2002 | Mizukawa et al. | ...... | 106/31.47 |

FOREIGN PATENT DOCUMENTS

| JP | 56-157468 | 12/1981 |
| JP | 58-45272 | 3/1983 |
| JP | 4-18468 | 1/1992 |
| JP | 6-340835 | 12/1994 |
| JP | 7-268254 | 10/1995 |
| JP | 7-268257 | 10/1995 |
| JP | 7-268260 | 10/1995 |
| JP | 10-110126 | 4/1998 |
| JP | 10-195355 | 7/1998 |
| JP | 11-286637 | 10/1999 |

* cited by examiner

*Primary Examiner*—Helene Klemanski
(74) *Attorney, Agent, or Firm*—Burns, Doane, Swecker & Mathis, LLP

(57) ABSTRACT

An ink-jet ink which includes a coloring composition which contains an oil-soluble dye represented in the following formula (I). In the formula (I), $R^1$ and $R^2$ represent respectively independently a hydrogen atom, a halogen atom, an aliphatic group, an aromatic group, or the like. A represents —$NR^5R^6$ or a hydroxyl group. $R^5$ and $R^6$ represent respectively independently a hydrogen atom, an aliphatic group, or the like. $B^1$ represents =$C(R^7)$— or =$N$—, and $B^2$ represents —$C(R^8)$= or —$N$=. $R^3$, $R^4$, $R^7$, and $R^8$ represent respectively independently a hydrogen atom, a halogen atom, an aliphatic group, an aromatic group, or the like. Q includes at least one nitrogen atom and, together with a carbon atom to be combined, represents an atom group which is required to form a nitrogen-containing heterocyclic ring having a five-membered ring or more.

Formula (I)

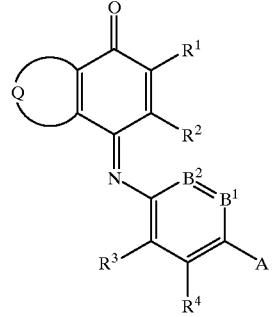

20 Claims, No Drawings

COLORING COMPOSITION, INK-JET INK, AND INK JET RECORDING METHOD

BACKGROUND OF THE INVENTION

1. Field of the Invention

The present invention relates to an aqueous coloring composition containing an oil-soluble dye, to an ink-jet ink, and to an ink jet recording method using the ink-jet ink, and in particular to a coloring composition that is excellent in color reproduction and suitable for aqueous ink, aqueous printing ink, information-recording ink and the like, as well as to an ink-jet ink and an ink jet recording method that are suitable for thermal, piezoelectric, electric field or acoustic ink jetting systems.

2. Description of the related art

As computers have spread in recent years, ink jet printers have been widely used for recording on paper, film, cloth and the like not only in offices but also in homes. As ink jet recording inks, oil-soluble inks, water-based inks and solid inks are known. Of these inks, water-based inks are advantageous in view of ease of production and handling, smell, safety and so on. Thus, water-based inks are mainly used.

The reason why water-soluble inks in water-based inks are used is that a water-soluble ink has advantages of ease of production of the ink, superior preservation stability, good color hue and high color density. However, water-soluble dye has poor water resistance, so that bleeding is caused if recording is carried out with the ink on plain paper. As a result, problems that recording quality deteriorates remarkably and light resistance is poor arise.

Thus, for example, Japanese Patent Application Laid-Open (JP-A) No. 56-157468, JP-A No. 4-18468, JP-A No. 10-110126 and JP-A No. 10-195355 suggest water-based inks containing a pigment or a dispersed dye in order to solve the above-mentioned problems.

The water resistance of these water-based inks is improved to some extent. However, it is difficult to say that water resistance is sufficient, and the following problems arise: a dispersant of the pigment or the dispersed dye in the water-based ink has insufficient preservation stability, such that an ink jet opening is easily blocked with the water-based ink; and the water-based inks in general have insufficient hue, and color reproducibility deteriorates because of the insufficient hue.

JP-A No. 58-45272, JP-A No. 6-340835, JP-A No. 7-268254, JP-A No. 7-268257 and JP-A No. 268260 suggest methods of causing a dye to be capsuled in urethane or polyester dispersant particles.

These methods however have the following problems: color reproducibility is insufficient because of insufficient color tone; and dispersion-stability and water resistance of the dye-capsuled polymer dispersant, when the dye is capsuled at a desired level, are not necessarily sufficient.

SUMMARY OF THE INVENTION

An object of the present invention is to provide a coloring composition: which has no paper dependence; which has an excellent color formation efficiency/color tone when printing is effected on a paper which is arbitrarily selected; which has an excellent handling ability, odor ability, safety, water resistance, light resistance, or the like; which enables a high recording concentration/high image quality; and which is suitable for an aqueous ink for writing, an aqueous printing ink, an ink for information recording, or the like. Further, an object of the present invention is to provide an ink-jet ink: which includes the above-described coloring composition; which is suitable for a thermal, piezoelectric, electric field, or acoustic ink jet type; in which, when printing or the like is carried out using a nozzle or the like, a clogging does not occur at the distal end of the nozzle; which has no paper dependence; which has an excellent color formation efficiency/color tone when printing is effected on a paper which is arbitrarily selected; and which has an excellent water resistance and light resistance. Furthermore, an object of the present invention is to provide an ink jet recording method which enables the high quality recording using the ink-jet ink.

The object described above can be achieved by the following means:

A first aspect of the present invention is an ink-jet ink, which includes a coloring composition containing an oil-soluble dye represented in the following formula (I):

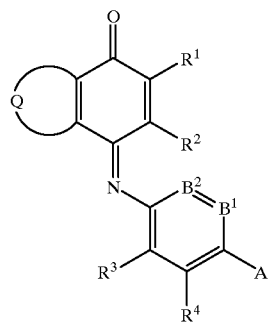

Formula (I)

wherein, $R^1$ and $R^2$ represent respectively independently one of a hydrogen atom, a halogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, and $NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently one of a hydrogen atom, an aliphatic group, and an aromatic group;

$R^1$ and $R^2$ may be connected to each other and form a ring;

A represents one of $-NR^5R^6$ and a hydroxyl group;

$R^5$ and $R^6$ represent respectively independently one of a hydrogen atom, an aliphatic group, an aromatic group, and a heterocyclic group;

$B^1$ represents one of $=C(R^7)-$ and $=N-$ and $B^2$ represents one of $-C(R^8)=$ and $-N=$;

$R^3$, $R^4$, $R^7$ and $R^8$ represent respectively independently one of a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $-NR^{65}CO_2R^{66}$, $COR^{67}$, $-NR^{68}COR^{69}$, and $NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently one of a hydrogen atom, an aliphatic group, and an aromatic group;

$R^3$ and $R^4$, $R^4$ and $R^5$, $R^5$ and $R^6$, $R^6$ and $R^7$, and $R^7$ and $R^8$ may be combined with each other and form rings; and Q includes at least one nitrogen atom and, together with a carbon atom to be combined, represents an atom group which is required to form a nitrogen-containing heterocyclic ring having a five-membered ring or more.

A second aspect of the present invention is a coloring composition containing an oil-soluble dye which is represented in the above-described formula (I):

A third aspect of the present invention is an ink jet recording method in which an ink-jet ink is used in recording, which the ink-jet ink includes a coloring composition containing an oil-soluble dye represented in the above-described formula (I):

DESCRIPTION OF THE PREFERRED EMBODIMENTS

Hereinafter, description will be given of a coloring composition, an ink-jet ink, and an ink jet recording method of the present invention.

[Coloring Composition]

The coloring composition of the present invention contains an oil-soluble dye, and the oil-soluble dye is dispersed in a water-based medium.

As far as the above-described water-based medium at least contains water, the water-based medium is sufficient. More specifically, a suitable water-based medium is the one which includes water, or the mixture of water and a water miscible organic solvent, to which, as occasion demands, an additive such as a surface active agent, a dry-preventing agent (wetting agent), a stabilizer, an antiseptic, or the like is added.

-Oil-soluble Dye-

The above oil-soluble dye is a compound represented in the following formula (I) and is an oil-soluble azomethine dye.

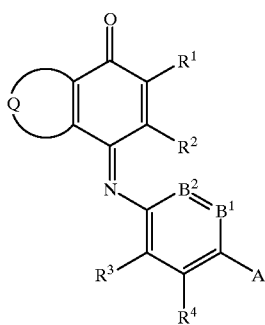

Formula (I)

In the above formula (I), each of $R^1$ and $R^2$ represents a hydrogen atom, a halogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $NR^{30}SO_2R^{31}$. $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently a hydrogen atom, an aliphatic group, or an aromatic group.

Among the aforementioned, it is preferable that the above-described $R^1$ represents $-NR^{22}CONR^{23}R^{24}$, $-NR^{25}CO_2R^{26}$, $-NR^{28}COR^{29}$, or $NR^{30}SO_2R^{31}$. It is more preferable that $R^1$ represents $-NR^{22}CONR^{23}R^{24}$, $-NR^{25}CO_2R^{26}$, or $-NR^{28}COR^{29}$, and particularly more preferable that $R^1$ represents $-NHCOR^{29}$.

Among the aforementioned, it is preferable that the above-described $R^2$ represents a hydrogen atom.

In the present invention, the aliphatic group means an alkyl group, a substituted alkyl group, an alkenyl group, a substituted alkenyl group, an alkynyl group, a substituted alkynyl group, an aralkyl group, and a substituted aralkyl group.

The above-described alkyl group may have a branching or may form a ring. The alkyl group has preferably 1 to 20 carbon atoms, and has more preferably 1 to 18 carbon atoms.

An alkyl portion of the above substituted alkyl group is the same as the above-described alkyl group.

The above alkenyl group may have a branching or may form a ring. The alkenyl group has preferably 2 to 20 carbon atoms, and has more preferably 2 to 18 carbon atoms.

An alkenyl portion of the above substituted alkenyl group is the same as the above-described alkenyl group.

The above alkynyl group may have a branching or may form a ring. The alkynyl group has preferably 2 to 20 carbon atoms, and has more preferably 2 to 18 carbon atoms.

An alkynyl portion of the above substituted alkynyl group is the same as the above-described alkynyl group.

An alkyl portion of the above aralkyl group and the substituted aralkyl group are the same as the above alkyl group. An aryl portion of the aralkyl group and the substituted aralkyl group are the same as the aryl group below.

The substituents of the alkyl portion of the above substituted alkyl group, the substituted alkenyl group, the substituted alkynyl group, and the substituted aralkyl group include a halogen atom, a cyano group, a nitro group, a heterocyclic group, $-OR^{141}$, $-SR^{142}$, $-CO_2R^{143}$, $-NR^{144}R^{145}$, $-CONR^{146}R^{147}$, $-SO_2R^{148}$, and $-SO_2NR^{149}R^{150}$. $R^{141}$, $R^{142}$, $R^{143}$, $R^{144}$, $R^{145}$, $R^{146}$, $R^{147}$, $R^{148}$, $R^{149}$, and $R^{150}$ represent respectively independently a hydrogen atom, an aliphatic group, or an aromatic group.

Examples of the substituent of the aryl portion of the above substituted aralkyl group are the same as the following examples of a substituent of the substituted aryl group.

In the present invention, the aromatic group means an aryl group and a substituted aryl group.

The above-described aryl group is preferably phenyl or naphthyl, and is more preferably phenyl.

An aryl portion of the above substituted aryl group is the same as the above-described aryl group.

Examples of the substituent of the above substituted aryl group include a halogen atom, a cyano group, a nitro group, an aliphatic group, a heterocyclic group, $-OR^{151}$, $-SR^{152}$, $-CO_2R^{153}$, $-NR^{154}R^{155}$, $-CONR^{156}R^{157}$, $-SO_2R^{158}$, and $SO_2NR^{159}R^{160}$. $R^{151}$, $R^{152}$, $R^{153}$, $R^{154}$, $R^{155}$, $R^{156}$, $R^{157}$, $R^{158}$, $R^{159}$, and $R^{160}$ represent respectively independently a hydrogen atom, an aliphatic group, or an aromatic group.

In the present invention, the heterocyclic group preferably includes a five-membered or six-membered saturated heterocyclic ring or a five-membered or six-membered unsaturated heterocyclic ring. An aliphatic ring, an aromatic ring, or another heterocyclic ring may be condensed into the heterocyclic ring. Examples of a hetero atom of the heterocyclic ring include B, N, O, S, Se, and Te. As the hetero atom, N, O, and S are preferable. It is preferable that the heterocyclic ring has a valence (univalent) in which a carbon atom is free (the heterocyclic group combines in the carbon atom). Examples of the above-described saturated heterocyclic ring include a pyrrolidine ring, a morpholine ring, a 2-bora-1,3-dioxolan ring, and a 1,3-thiazolizin ring. Examples of the above-described unsaturated ring include an imidazole ring, a thiazole ring, a benzothiazole ring, a benzooxazole ring, a benzotriazole ring, a benzoselenazole ring, a pyridine ring, a pyrimidine ring, and a quinoline ring.

The above-described heterocyclic ring may have a substituent. Examples of the substituent include a halogen atom, a cyano group, a nitro group, an aliphatic group, an aromatic group, a heterocyclic group, $-OR^{171}$, $-SR^{172}$, $-CO_2R^{173}$, $-NR^{174}R^{175}$, $-CONR^{176}R^{177}$, $-SO_2R^{178}$, and $SO_2NR^{179}R^{180}$. $R^{171}$, $R^{172}$, $R^{173}$, $R^{174}$, $R^{175}$, $R^{176}$, $R^{177}$, $R^{178}$, $R^{179}$, and $R^{180}$ represent respectively independently a hydrogen atom, an aliphatic group, or an aromatic group.

In the above formula (I), A represents $-NR^5R^6$ or a hydroxyl group. $R^5$ and $R^6$ represent respectively independently a hydrogen atom, an aliphatic group, an aromatic group, or a heterocyclic group. A represents preferably $-NR^5R^6$.

It is preferable that the above-described $R^5$ and $R^6$ represent respectively independently a hydrogen atom or an aliphatic group. It is more preferable that $R^5$ and $R^6$ represent a hydrogen atom, an alkyl group, or a substituted alkyl group, and is particularly more preferable that $R^5$ and $R^6$ represent a hydrogen atom, an alkyl group having 1 to 18 carbon atoms, or a substituted alkyl group having 1 to 18 carbon atoms.

In the above formula (I), $B^1$ represents $=C(R^7)-$ or $=N-$, and $B^2$ represents $-C(R^8)=$ or $-N=$. It is preferable that $B^1$ and $B^2$ do not represent $-N=$ simultaneously, and is more preferable that $B^1$ represents $=C(R^7)-$ and $B^2$ represents $-C(R^8)=$. In this case, in the formula (I), $R^3$, $R^4$, $R^7$, and $R^8$ represent respectively independently a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $-NR^{65}CO_2R^{66}$, $-COR^{67}$, $-NR^{68}COR^{69}$, or $NR^{70}SO_2R^{71}$. $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently a hydrogen atom, an aliphatic group, or an aromatic group.

Among the aforementioned, it is preferable that the above $R^3$ and $R^8$ represent respectively independently a hydrogen atom, a halogen atom, an aliphatic group, $-OR^{51}$, $-NR^{62}CONR^{63}R^{64}$, $-NR^{65}CO_2R^{66}$, $-NR^{68}COR^{69}$, or $NR^{70}SO_2R^{71}$. It is more preferable that $R^3$ and $R^8$ represent a hydrogen atom, a fluorine atom, a chlorine atom, an alkyl group, a substituted alkyl group, $-NR^{62}CONR^{63}R^{64}$, or $-NR^{68}COR^{69}$. It is furthermore preferable that $R^3$ and $R^8$ represent a hydrogen atom, a chlorine atom, an alkyl group having 1 to 10 carbon atoms, or a substituted alkyl group having 1 to 10 carbon atoms. It is particularly more preferable that $R^3$ and $R^8$ represent a hydrogen atom, an alkyl group having 1 to 4 carbon atoms, or a substituted alkyl group having 1 to 4 carbon atoms.

Among the aforementioned, it is preferable that the above $R^4$ and $R^7$ represent respectively independently a hydrogen atom, a halogen atom, or an aliphatic group. It is more preferable that $R^4$ and $R^7$ represent a hydrogen atom, a fluorine atom, a chlorine atom, an alkyl group, or a substituted alkyl group. It is furthermore preferable that $R^4$ and $R^7$ represent a hydrogen atom, a chlorine atom, an alkyl group having 1 to 10 carbon atoms, or a substituted alkyl group having 1 to 10 carbon atoms. It is particularly more preferable that $R^4$ and $R^7$ represent a hydrogen atom.

In the above formula (I), $R^3$ and $R^4$, $R^4$ and $R^5$, $R^5$ and $R^6$, $R^6$ and $R^7$, or $R^7$ and $R^8$ can be combined with each other and form a ring.

The preferable ring forming combination is $R^4$ and $R^5$, $R^5$ and $R^6$, or $R^6$ and $R^7$.

It is preferable that the ring, in which $R^3$ and $R^4$ are combined with each other and form, or the ring, in which $R^7$ and $R^8$ are combined with each other and form, is a five-membered ring or a six-membered ring. The ring is preferably an aromatic ring (e.g., a benzene ring) or an unsaturated heterocyclic ring (e.g., a pyridine ring, an imidazole ring, a thiazole ring, a pyrimidine ring, a pyrrole ring, and a furan ring).

It is preferable that the ring, in which $R^4$ and $R^5$ are combined with each other and form, or the ring, in which $R^6$ and $R^7$ are combined with each other and form, is a five-membered ring or a six-membered ring. Examples of the ring include a tetrahydroquinoline ring or a dihydroindole ring.

It is preferable that the ring, in which $R^5$ and $R^6$ are combined with each other and form, is a five-membered ring or a six-membered ring. Examples of the ring include a pyrrolidine ring, a piperidine ring, or a morpholine ring.

In the above formula (I), Q includes at least one nitrogen atom, and, together with a carbon atom to be combined, represents an atom group which is required to form a nitrogen-containing heterocyclic ring having a five-membered ring or more. Examples of a bivalent group which forms a ring other than the nitrogen atom include a bivalent amino group, an ether linkage, a thioether linkage, an alkylene group, a vinylene linkage, an imino linkage, a sulfonyl group, a carbonyl group, an arylene group, a bivalent hetero ring, or the like. A plurality of these groups may be combined, and the groups may further have substituents.

The above-described Q preferably represents $-NHCO-C(R^{91})(R^{92})-$ or $-NHCO-C(R^{93})(R^{94})-C(R^{95})(R^{96})-$. $R^{91}$, $R^{92}$, $R^{93}$, $R^{94}$, $R^{95}$, and $R^{96}$ represent respectively independently a hydrogen atom, a halogen atom, an aliphatic group, an aromatic group, a heterocyclic group, a cyano group, $-OR^{101}$, $-SR^{102}$, $-CO_2R^{103}$, $-OCOR^{104}$, $NR^{105}R^{106}$, $-CONR^{107}R^{108}$, $-SO_2R^{109}$, $-SO_2NR^{110}R^{111}$, $-NR^{112}CONR^{113}R^{114}$, $-NR^{115}CO_2R^{116}$, $-COR^{117}$, $-NR^{118}COR^{119}$, or $NR^{120}SO_2R^{121}$. $R^{101}$, $R^{102}$, $R^{103}$, $R^{104}$, $R^{105}$, $R^{106}$, $R^{107}$, $R^{108}$, $R^{109}$, $R^{110}$, $R^{111}$, $R^{112}$, $R^{113}$, $R^{114}$, $R^{115}$, $R^{116}$, $R^{117}$, $R^{118}$, $R^{119}$, $R^{120}$, and $R^{121}$ represent respectively independently a hydrogen atom, an aliphatic group, or an aromatic group. $R^{91}$ and $R^{92}$, $R^{93}$ and $R^{94}$, $R^{94}$ and $R^{95}$, and $R^{95}$ and $R^{96}$ may be combined with each other and form rings.

It is preferable that the above-described $R^{91}$, $R^{92}$, $R^{93}$, $R^{94}$, $R^{95}$, and $R^{96}$ represent respectively independently a hydrogen atom, an aliphatic group, an aromatic group, or a heterocyclic group. It is more preferable that $R^{91}$, $R^{92}$, $R^{93}$, $R^{94}$, $R^{95}$, and $R^{96}$ represent an alkyl group or a substituted alkyl group, and is particularly more preferable that $R^{91}$, $R^{92}$, $R^{93}$, $R^{94}$, $R^{95}$, and $R^{96}$ represent an alkyl group having 1 to 18 carbon atoms or a substituted alkyl group having 1 to 18 carbon atoms.

Preferably, three or more of $R^{93}$, $R^{94}$, $R^{95}$, and $R^{96}$ do not represent a hydrogen atom at the same time. Further, when two of $R^{93}$, $R^{94}$, $R^{95}$, and $R^{96}$ represent the hydrogen atom at the same time, it is preferable that any one set of $R^{93}$ and $R^{94}$, $R^{94}$ and $R^{95}$, and $R^{95}$ and $R^{96}$ forms a ring, or that $R^{93}$ and $R^{94}$ or $R^{95}$ and $R^{96}$ represent the hydrogen atom.

It is preferable that the ring in which the above-described $R^{91}$ and $R^{92}$ are combined with each other and form, the ring in which the above-described $R^{93}$ and $R^{94}$ are combined with each other and form, the ring in which the above-described $R^{94}$ and $R^{95}$ are combined with each other and form, and the ring in which the above-described $R^{95}$ and $R^{96}$ are combined with each other and form, are five-membered rings or six-membered rings. Examples of the ring include a cyclopentane ring, a cyclohexane ring, a tetrahydropyranyl ring, or the like.

The oil-soluble dye represented in the above formula (I) in the present invention is preferably an oil-soluble dye represented in the following formula (II) or (III).

Formula (II)

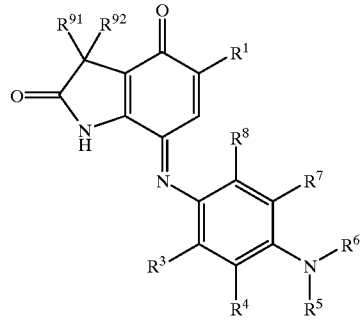

Formula (III)

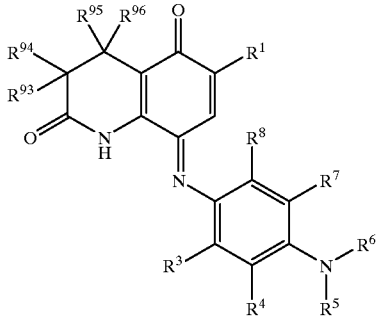

wherein, $R^1$, $R^3$, $R^4$, $R^5$, $R^6$, $R^7$, $R^8$, $R^{91}$, $R^{92}$, $R^{93}$, $R^{94}$, $R^{95}$, and $R^{96}$ are synonymous with the aforementioned.

Illustrative compounds (C-1 to C-65) of the oil-soluble dye (azomethine dye) which is represented in the above formula (I) are shown below.

(C-1)

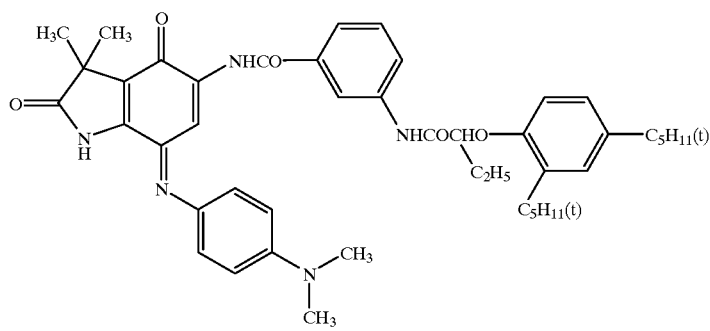

(C-2)

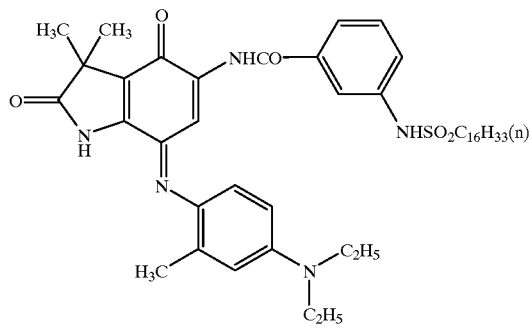

(C-3)

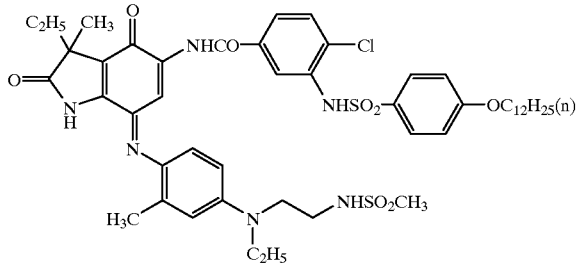

(C-4)

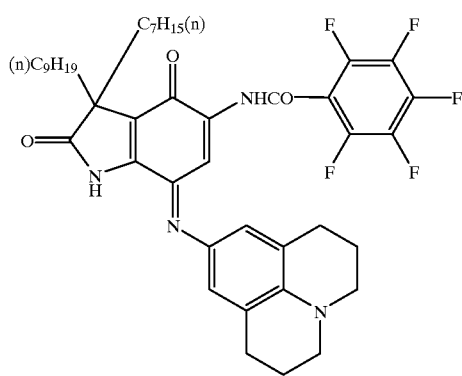

(C-5)

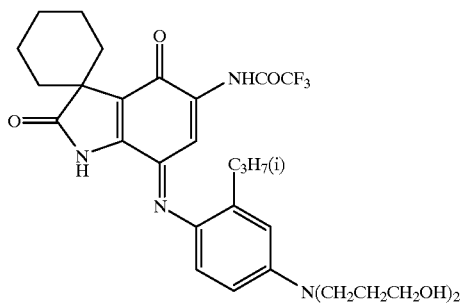

-continued
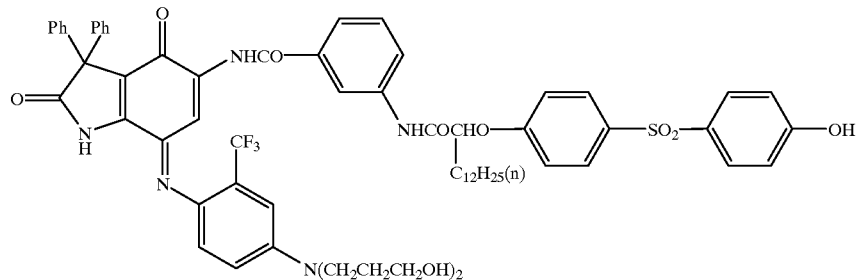
(C-6)
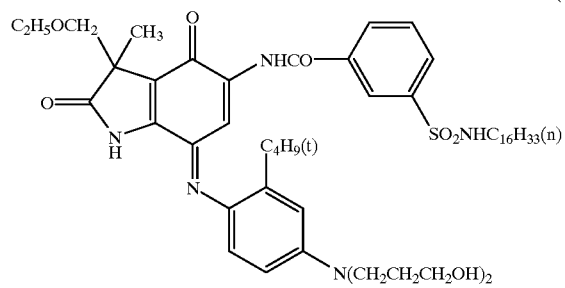
(C-7)
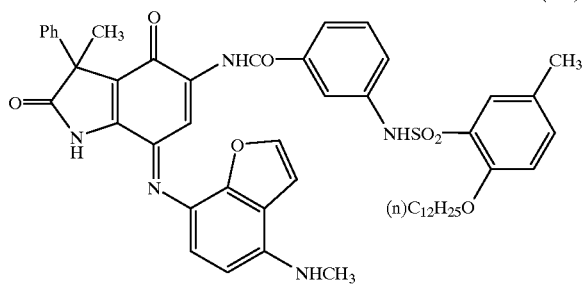
(C-8)
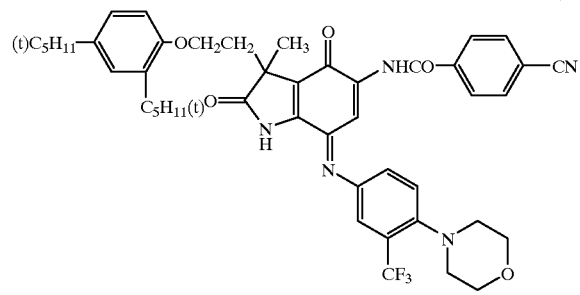
(C-9)
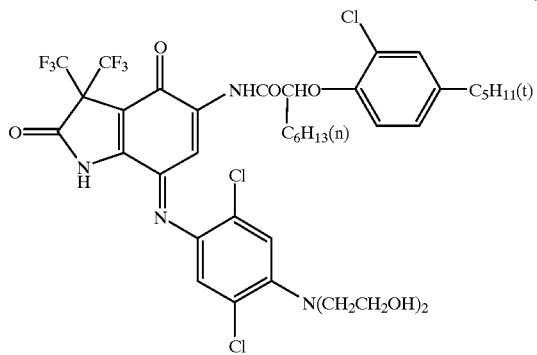
(C-10)
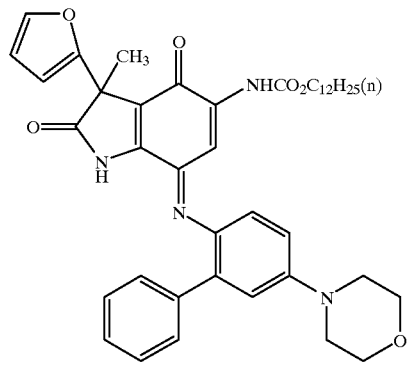
(C-11)
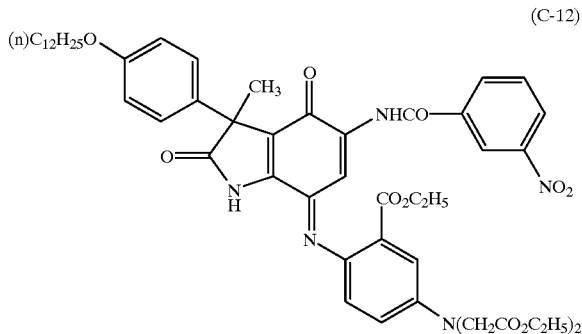
(C-12)

-continued
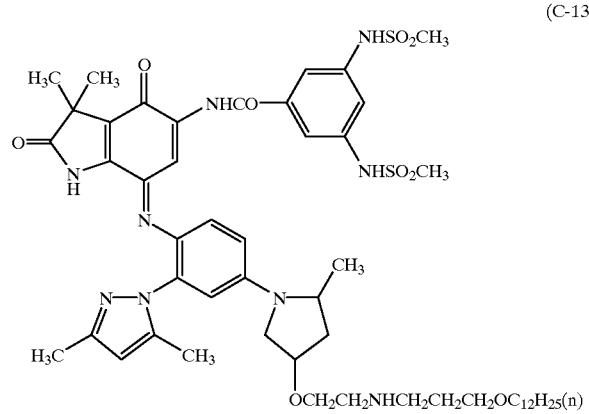 (C-13)
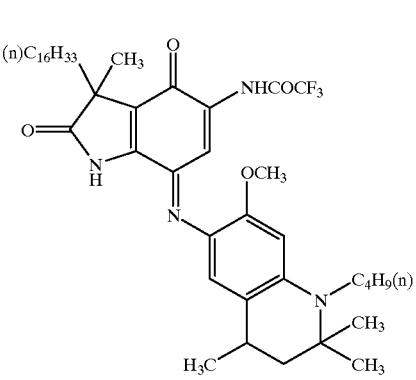 (C-14)
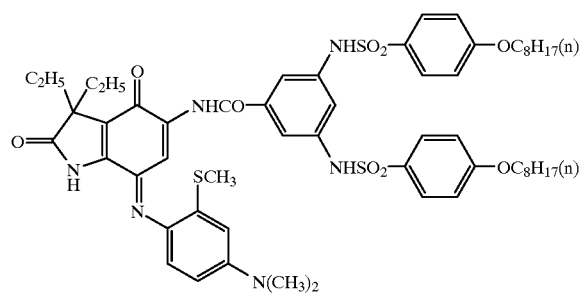 (C-15)
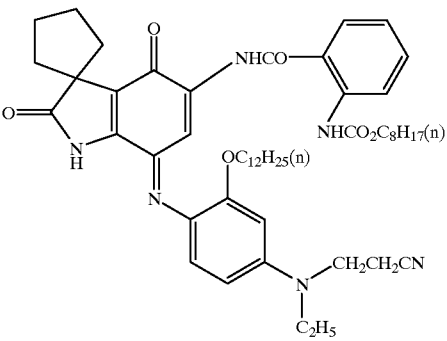 (C-16)
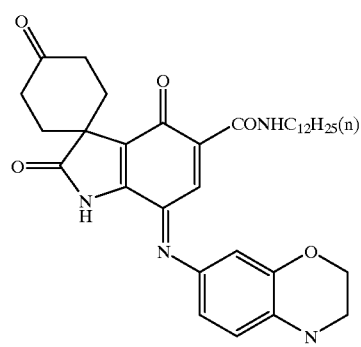 (C-17)
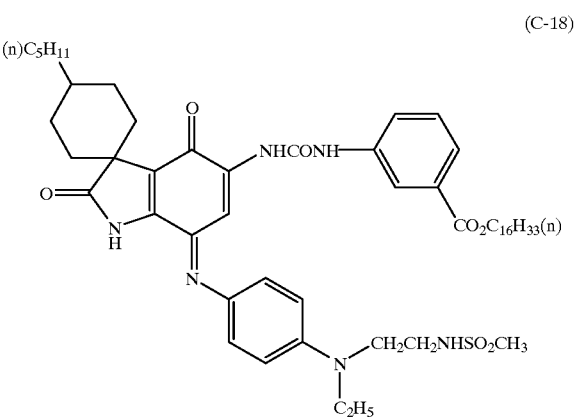 (C-18)
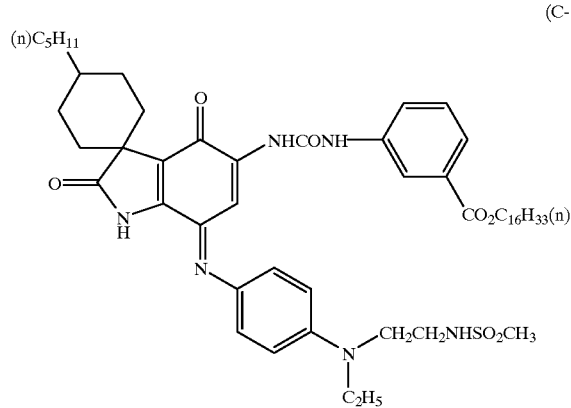 (C-18)
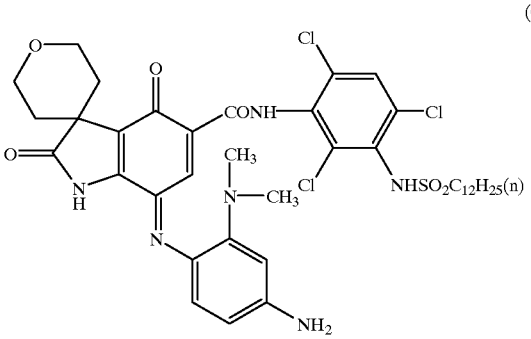 (C-19)

(C-20) 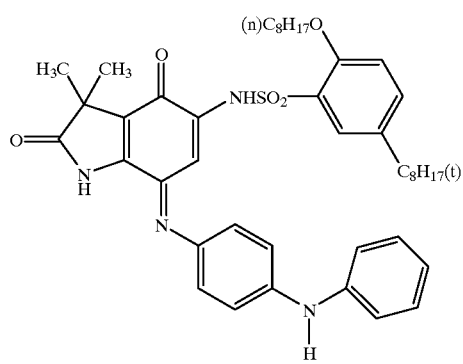
(C-21) 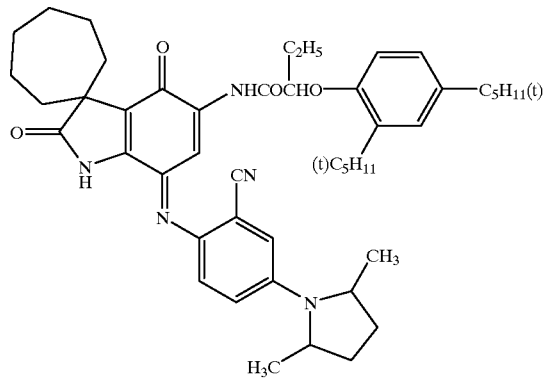
(C-22) 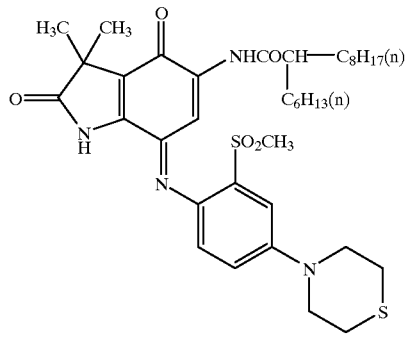
(C-23) 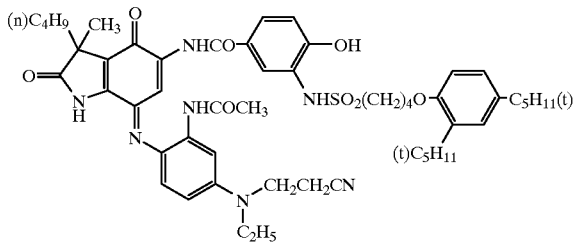
(C-24) 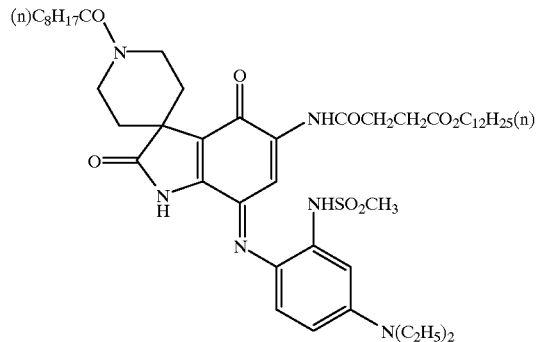
(C-25) 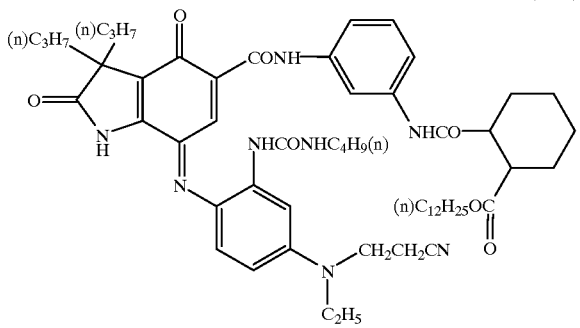
(C-26) 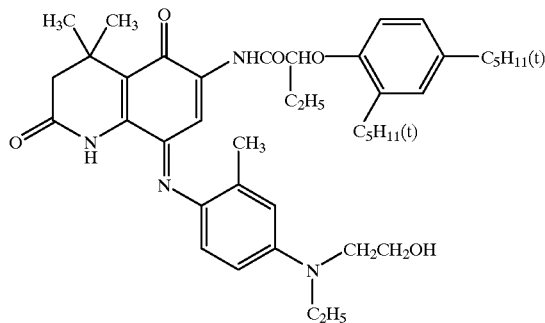
(C-27) 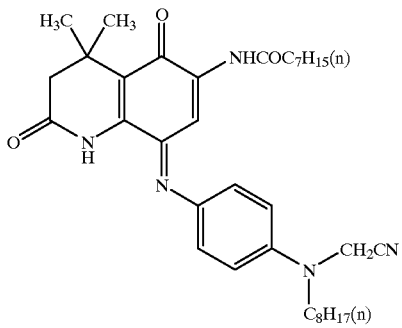

-continued
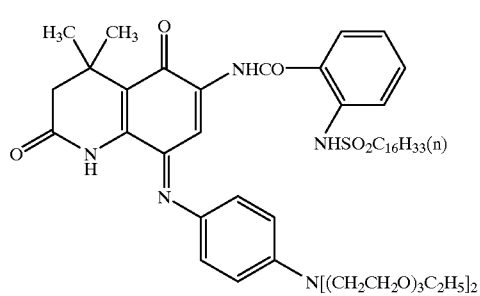
(C-28)
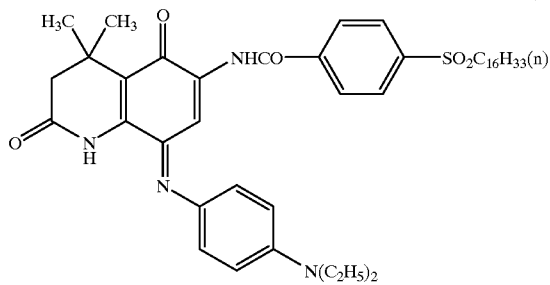
(C-29)
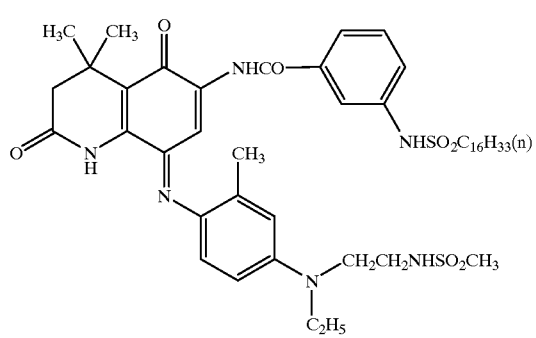
(C-30)
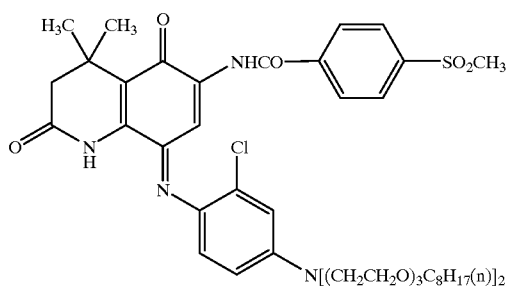
(C-31)
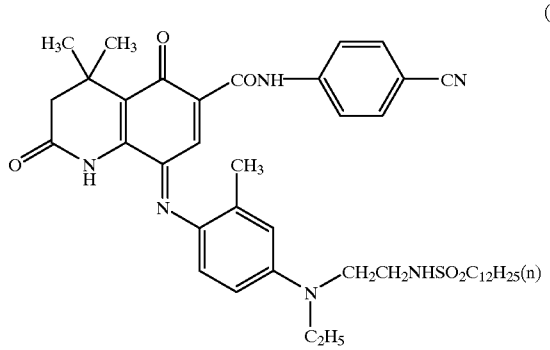
(C-32)
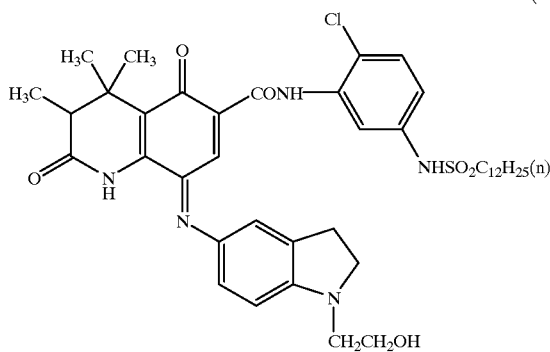
(C-33)
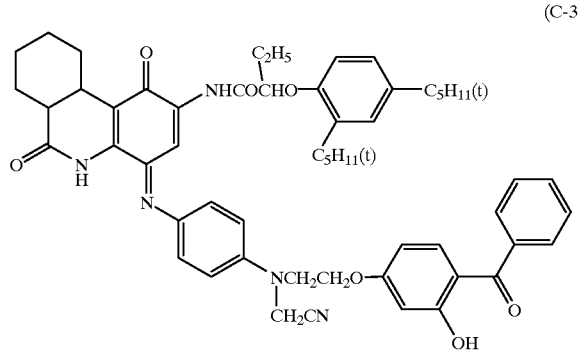
(C-34)
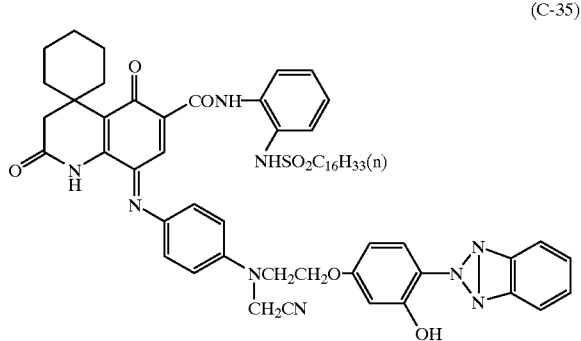
(C-35)

-continued
(C-36) 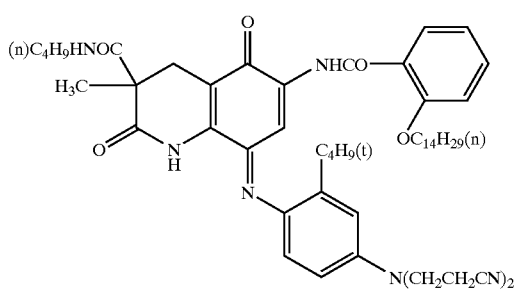
(C-37) 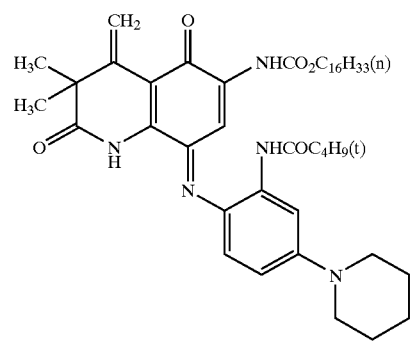
(C-38) 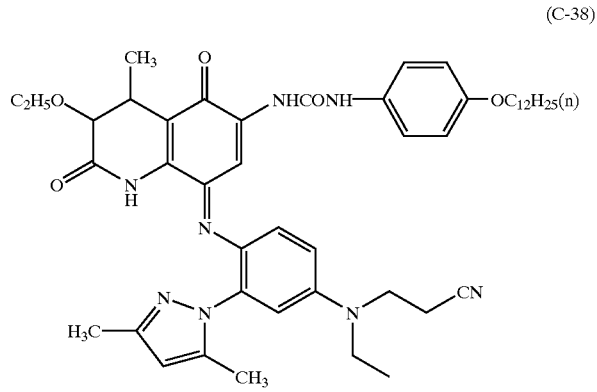
(C-39) 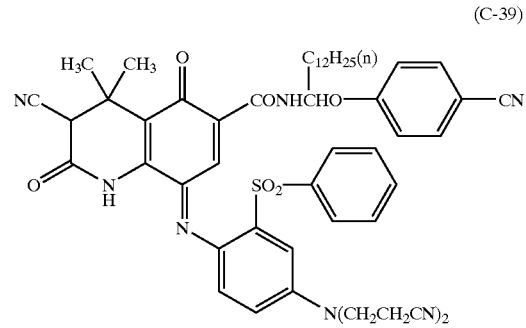
(C-40) 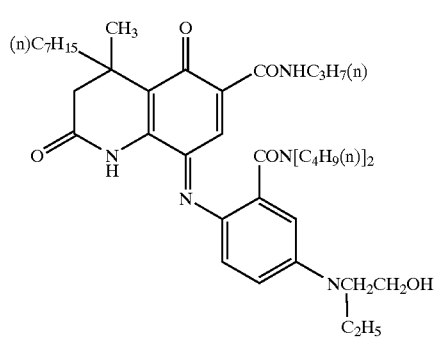
(C-41) 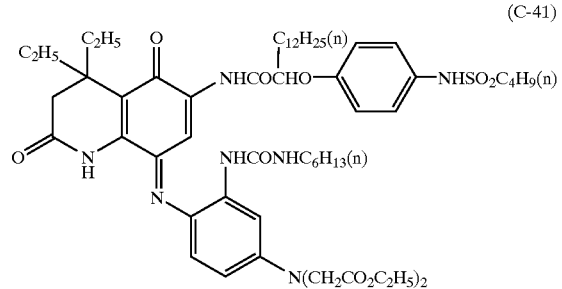
(C-42) 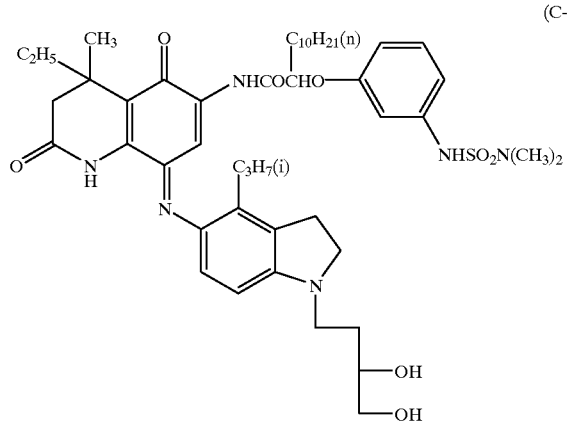
(C-43) 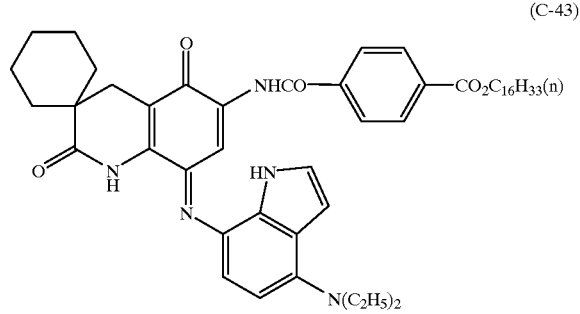

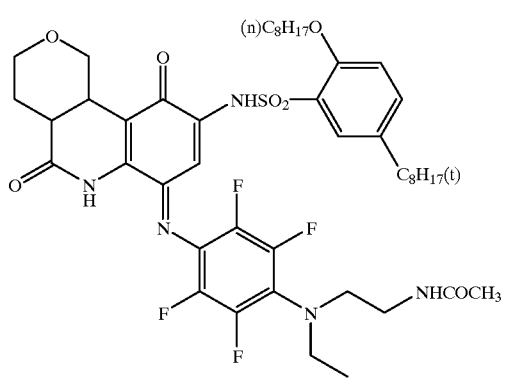 (C-44)
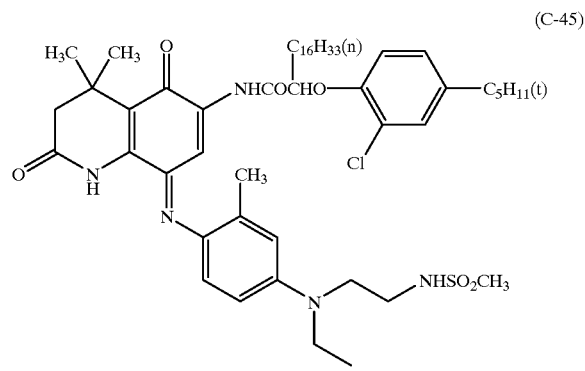 (C-45)
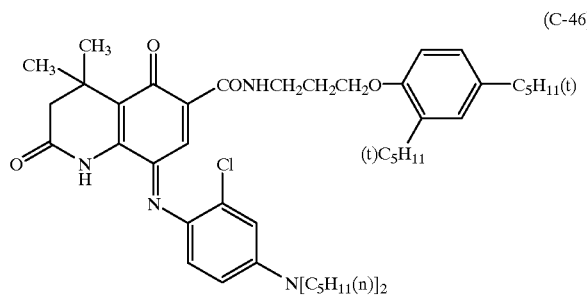 (C-46)
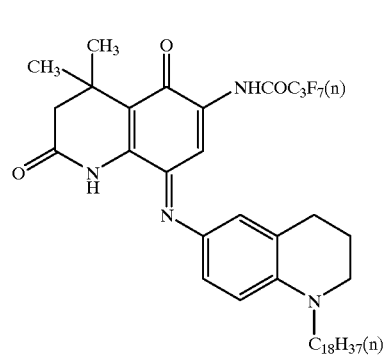 (C-47)
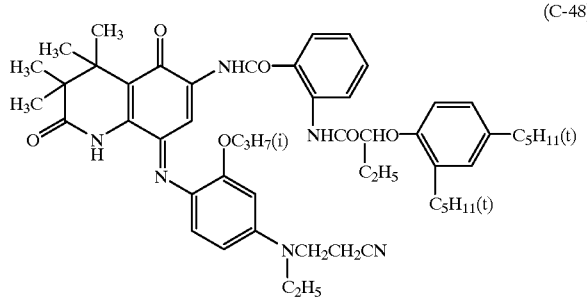 (C-48)
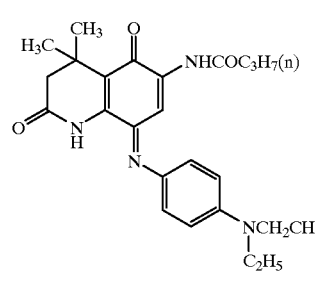 (C-49)
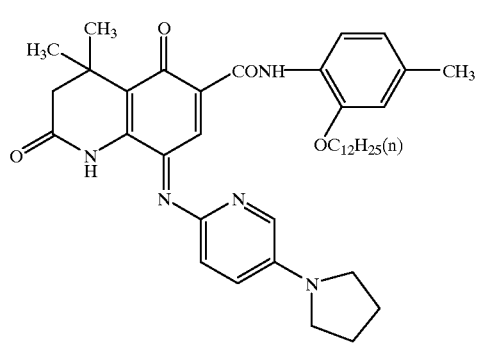 (C-50)
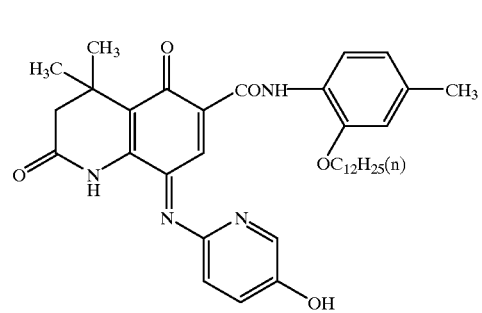 (C-51)

(C-52)
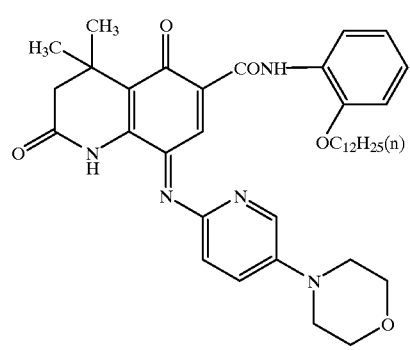
(C-53)
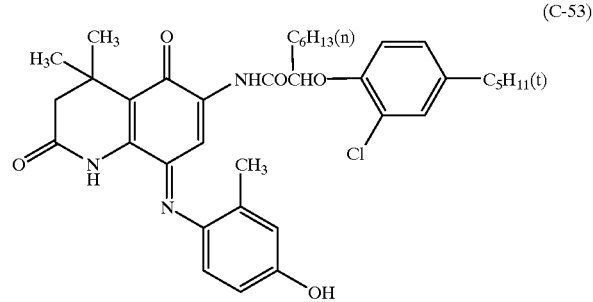
(C-54)
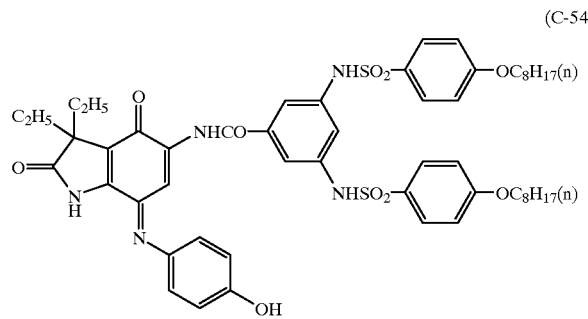
(C-55)
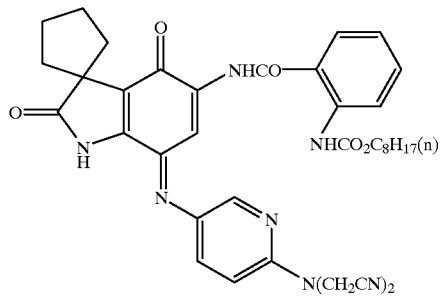
(C-56)
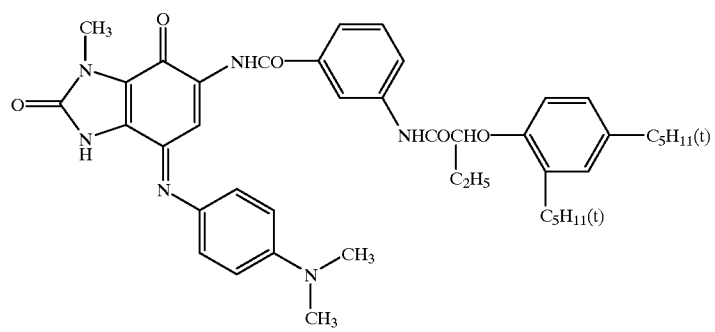
(C-57)
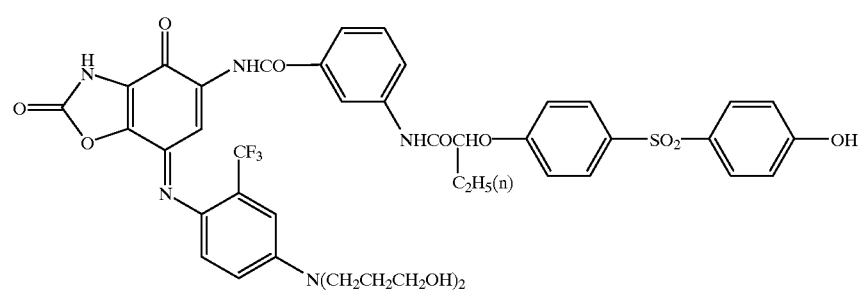

-continued

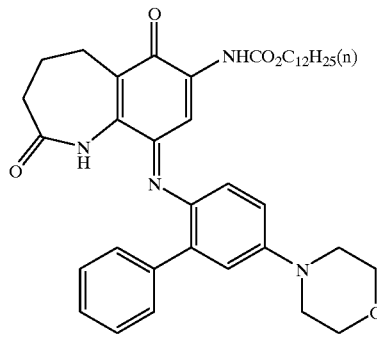
(C-58)

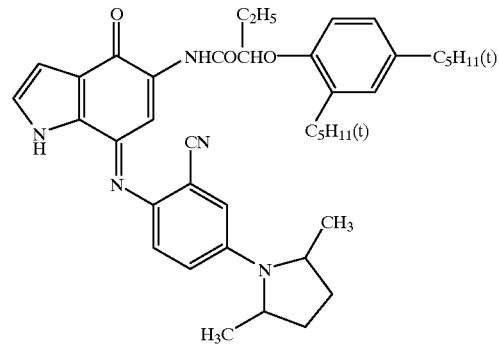
(C-59) (C-60) (C-61)

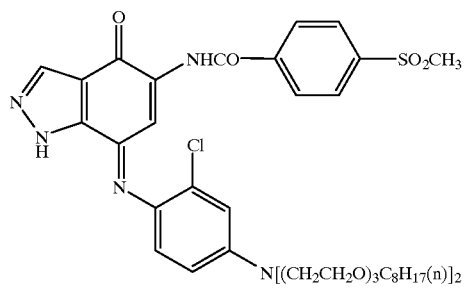
(C-62) (C-63)

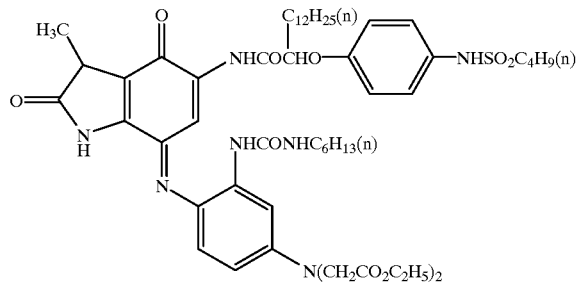
(C-64) (C-65)

The oil-soluble dye represented in the above formula (I) can be synthesized by effecting coupling reaction in the presence of base and under the oxidative condition, for example, a condensed ring phenol compound which is represented as 1 in the following scheme and a p-phenylenediamine compound which is represented as 3 in the following scheme. In the reaction, any of an organic oxidizing agent (an N-halocarbonoacid amide such as N-bromoacetamide, N-bromosuccinimide, N-chlorosuccinimide, N-iodosuccinimide, N-bromophthalimide, isocyanuruchroride, N-bromocaprolactam, 1,3-dibromo-5,5-dimethylhydantoin, or the like; an organic peracid such as peracetic acid, perbenzoic acid, methachloro perbenzoic acid, performic acid, or the like; an organic peroxide such as t-butylhydroperoxide, benzoyl peroxide, or the like; quinone such as 2,3-dichloro-5,6-dicyano 1,4-benzoquinone, tetrachloro 1,2-benzoquinone, or the like; and hypohalogenoacid ester such as t-butyl hypochlorite, or the like) and an inorganic oxidizing agent (an oxidizing metallic compound such as potassium ferricyanide, silver nitrate, or the like; halogen such as bromine, iodine, or the like; and a peroxide such as ammonium peroxodisulfate, or the like) may be used. Among them, N-bromosuccinimide and ammonium peroxodisulfate are preferable.

Further, the base includes an organic base (an aliphatic amine such as triethylamine, tripropylamine, triethanolamine, or the like; an aromatic amine such as N,N-dimethylaniline, N,N-diethylaniline, or the like; and a nitrogen-containing unsaturated hetero ring such as pyridine, 2,6-lutidine, pyridazine, N-imidazole, or the like) and an inorganic base (carbonate such as potassium carbonate, sodium carbonate, sodium hydrogencarbonate, potassium hydrogencarbonate, or the like; and a metallic hydroxide such as sodium hydroxide, potassium hydroxide, or the like). Any base may be used. Among them, the aliphatic amine and the carbonate are preferable.

Moreover, a reaction solvent includes an organic solvent (an alcohol solvent such as methanol, ethanol, isopropyl alcohol, or the like; an amide solvent such as N, N-dimethylacetamide, N, N-dimethylformamide, 1-methyl-2-pyrolidone, or the like; a sulfone solvent such as sulfolane, or the like; a sulfoxido solvent such as dimthylsulfoxido, or the like; an ureido solvent such as tetramethylurea, or the like, a halogen solvent such as dichloromethane, chloroform, 1,2-dichloroethane, or the like; an ester solvent such as ethyl acetate, butyl acetate, or the like; and ether solvent such as diethyl ether, tetrahydrofuran, or the like). The organic solvents can be used alone, as a mixture of the plural solvents, or further, as a mixture of the organic solvent and water. Among the solvents, the halogen solvent and the ester solvent are preferable, and the halogen solvent, with which the alcohol solvent and the water are mixed, and the ester solvent therewith are also preferable. Moreover, the reaction is carried out at a reaction temperature within the range of −78° C. to 100° C., and preferably within the range of 0° C. to 40° C.

oxide, or the like; and an acid halide such as thionyl chloride, phosphorus oxychloride, phosphorus oxybromide, or the like). Among them, the carboxylic anhydride is preferable.

A reaction solvent includes an organic solvent (an alcohol solvent such as methanol, ethanol, isopropyl alcohol, or the like; an amide solvent such as N,N-dimethylacetamide, N,N-dimethylformamide, 1-methyl-2-pyrolidone, or the like; a sulfone solvent such as sulfolane, or the like; a sulfoxido solvent such as dimthylsulfoxido, or the like; an ureido solvent such as tetramethylurea, or the like, a halogen solvent such as dichloromethane, chloroform, 1,2-dichloroethane, or the like; an ester solvent such as ethyl acetate, butyl acetate, or the like; ether solvent such as diethyl ether, tetrahydrofuran, or the like; a carboxylic acid solvent such as acetic acid, propionic acid, or the like; and pyridine solvent such as pyridine, 2,6-lutidine, or the like). The organic solvents can be used alone, as a mixture of the plural solvents, or further, as a mixture of the organic solvent and water. The reaction is carried out at a reaction temperature within the range of −78° C. to 150° C., and preferably within the range of 0° C. to 100° C.

The condensed ring phenol compounds represented as 1 or 2 in the above scheme can be synthesized in accordance with a method described in, for example, Japanese Patent Application Laid-Open (JP-A) No. 60-159851 or JP-A-1-105248.

A product which is obtained by these reactions is processed in accordance with a method of postprocessing of an ordinary organic synthesizing reaction, and thereafter, can be supplied with purification or without purification. Namely, for example, a product which is liberated from the

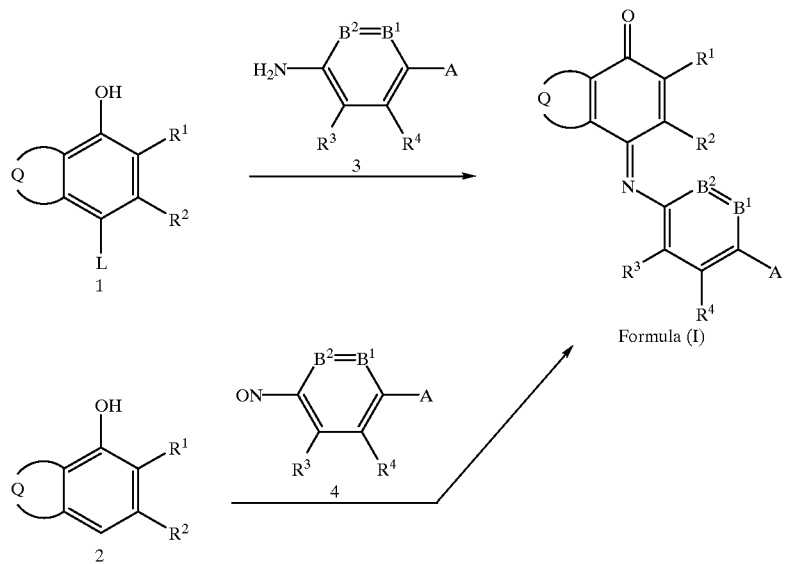

Formula (I)

Alternatively, the oil-soluble dye represented in the above formula (I) can be synthesized by dehydrating and condensing a condensed ring phenol compound which is represented as 2 in the above scheme and a nitroso compound which is represented as 4 in the above scheme. In the reaction, it is preferable to use any of an organic dehydration condensing agent (a carboxylic anhydride such as acetic anhydride, propionic acid anhydride, trifluoroacetic acid anhydride, or the like) and an inorganic dehydration condensing agent (an acid anhydride such as polyphosphoric acid, phosphorus(V)

reaction system can be supplied without purification. Alternatively, the liberated product is subjected to a single operation of or a combination of operations of purifying by recrystallization, column chromatography, or the like, and then can be supplied. Alternatively, after the end of the reaction, the reaction solvent is removed by distillation or is not removed by distillation, and then a product is supplied to water or ice. The product is neutralized and liberated, or the product is liberated without neutralization. The liberated product can be supplied without purification. Alternatively, the liberated product is subjected to a single operation of or a combination of operations of purifying by recrystallization, column chromatography, or the like, and then can be supplied. Moreover, alternatively, after the end of the reaction, the reaction solvent is removed by distillation or is not removed by distillation, and then a product is supplied to water or ice. The product is neutralized and extracted by the organic solvent, or the product is extracted without neutralization. The extracted product can be supplied without purification. Alternatively, the extracted product is subjected to a single operation of or a combination of operations of purifying by crystallization or column chromatography, and then can be supplied.

In the coloring composition of the present invention, it is preferable that the coloring particulates which contain the above oil-soluble dye and an oil-soluble polymer are dispersed in the above water-based medium.

-Oil-soluble Polymer-

The type of the oil-soluble polymer is not particularly limited, and can be appropriately selected from oil-soluble polymers known in the prior art, depending on purposes. Examples thereof include vinyl polymers and condensed polymers (polyurethane, polyester, polyamide, polyurea, and polycarbonate).

The oil-soluble polymer may be water-insoluble, water-dispersible (self-emulsifiable) or water-soluble, among which the water-dispersible polymer is preferable for easy production and dispersion stability of coloring particulates.

The water-dispersible polymer may be an ionic polymer, a nonionic dispersible group-containing polymer, and a mixed polymer thereof.

The ionic polymer includes polymers having cationic groups such as tertiary amino group and quaternary ammonium group, as well as polymers having anionic groups in carboxylic acid, sulfonic acid etc.

The nonionic dispersible group-containing polymer includes polymers containing nonionic dispersible groups such as polyethylene oxy group.

Among these, the anionic group-containing ionic polymers, nonionic dispersible group-containing polymers and mixed polymers thereof are preferable for dispersion stability of coloring particulates.

Examples of monomers forming the above-mentioned vinyl polymer include acrylic esters, methacrylic esters and vinyl esters. (Examples of the ester groups are ester groups having alkyl or aryl group which may have a substituent. Examples of the alkyl or aryl groups include methyl, ethyl, n-butyl, sec-butyl, tert-butyl, hexyl, 2-ethylhexy, tert-octyl, 2-chloroethyl, cyanoethyl, 2-acetoxyethyl, tetrahydrofurfuryl, 5-hydroxypentyl, cyclohexyl, adamantyl, norbonyl, benzyl, hydroxyethyl, 3-methoxybutyl, 2-(2-methoxyethoxy)ethyl, 1,2,2,2-tetrafluoroethyl, 1 H,1 H,2 H,2 H-perfluorodecyl, phenyl, 2,4,5-trimethylphenyl, and 4-chlorophenyl.)

Specific examples of the vinyl esters include vinyl esters of an aliphatic carbonic acid which may have a substituent, such as vinyl acetate, vinyl propionate, vinyl butyrate, vinyl isobutyrate, vinyl caproate, and vinyl chloroacetate; and vinyl esters of an aromatic carbonic acid which may have a substituent, such as vinyl benzoate, vinyl 4-methylbenzoate and vinyl salicylate.

The other monomers which form the above vinyl polymer include, for example, acrylamides, methacrylamides, olefins, the other monomers, and the like.

Specific examples of acrylamides include acrylamide, N-monosubstituted acrylamide, and N,N-disubstituted acrylamide. The substituent is an alkyl, aryl or silyl group that may have a substituent and is, for example, methyl, ethyl, n-propyl, isopropyl, n-butyl, tert-butyl, tert-octyl, cyclohexyl, adamantyl, norbonyl, benzyl, hydroxyethyl, ethoxyethyl, phenyl, 2,4,5-tetramethylphenyl, 4-chlorophenyl, or trimethylsilyl.

Specific examples of methacrylamides include methacrylamide, N-monosubstituted methacrylamide, and N,N-disubstituted methacryalmide. The substituent is an alkyl, aryl or silyl group that may have a substituent and is, for example, methyl, ethyl, n-propyl, isopropyl, n-butyl, tert-butyl, tert-octyl, cyclohexyl, adamantyl, norbonyl, benzyl, hydroxyethyl, ethoxyethyl, phenyl, 2,4,5-tetramethylphenyl, 4-chlorophenyl or trimethylsilyl.

Examples of olefins include ethylene, propylene, 1-pentene, vinyl chloride, vinylidene, isoprene, chloroprene, and butadiene. Specific examples of styrenes include styrene, methylstyrene, isopropylstyrene, methoxystyrene, acetoxystyrene, and chlorostyrene. Specific examples of vinyl ethers include methyl vinyl ether, butyl vinyl ether, hexyl vinyl ether, and methoxyethyl vinyl ether.

Examples of other monomers include crotonic esters, itaconic esters, maleic esters, phthalic esters, methyl vinyl ketone, phenyl vinyl ketone, methoxyethyl ketone, N-vinyloxazolidone, N-vinylpyrrolidone, vinylidene chloride, methylene malonic nitril, vinylidene, diphenyl-2-acryloyloxyethyl phosphate, diphenyl-2-methacryloyloxyethyl phosphate, dibutyl-2-acryloyloxyethyl phosphate, and dioctyl-2-methacryloyloxyethyl phosphate.

The ionic group-containing monomer includes anionic group-containing monomers and cationic group-containing monomers.

The anionic group-containing monomers include e.g. a carboxylic acid monomer, a sulfonic acid monomer, a phosphoric acid monomer, etc.

The carboxylic acid monomer includes e.g. acrylic acid, methacrylic acid, itaconic acid, maleic acid, fumaric acid, citraconic acid, crotonic acid, monoalkyl itaconates (e.g., monomethyl itaconate, monoethyl itaconate, monobutyl itaconate etc.), and monoalkyl maleates (e.g., monomethyl maleate, monoethyl maleate, monobutyl maleate etc.).

The sulfonic acid monomer includes styrene sulfonic acid, vinylsulfonic acid, acryloyloxyalkane sulfonic acid (e.g., acryloyloxymethane sulfonic acid, acryloyloxyethyl sulfonic acid, acryloyloxypropane sulfonic acid etc.), methacryloyloxyalkane sulfonic acid (e.g., methacryloyloxymethane sulfonic acid, methacryloyloxyethane sulfonic acid, methacryloyloxypropane sulfonic acid etc.), acrylamide alkyl sulfonic acid (e.g., 2-acrylamide-2-methylethane sulfonic acid, 2-acrylamide-2-methylpropane sulfonic acid, 2-acrylamide-2-methylbutane sulfonic acid etc.), and methacrylamide alkyl sulfonic acid (e.g., 2-methacrylamide-2-methylethane sulfonic acid, 2-methacrylamide-2-methylpropane sulfonic acid, 2-methacrylamide-2-methylbutane sulfonic acid etc.).

The phosphoric acid monomer includes e.g. vinyl phosphonic acid and methacryloyloxyethyl phosphonic acid.

Among these monomers, acrylic acid, methacrylic acid, styrene sulfonic acid, vinyl sulfonic acid, acrylamide alkyl sulfonic acid, and methacrylamide alkyl sulfonic acid are preferable, among which acrylic acid, methacrylic acid, styrene sulfonic acid, 2-acrylamide-2-methylpropane sulfonic acid and 2-acrylamide-2-methylbutane sulfonic acid are more preferable.

The cationic group-containing monomers described above include e.g. monomers having tertiary amino groups such as dialkylaminoethyl methacrylate and dialkylaminoethyl acrylate.

The nonionic dispersible group-containing monomers include e.g. esters of polyethylene glycol monoalkyl ether and carboxylic acid monomer, esters of polyethylene glycol monoalkyl ether and sulfonic acid monomer, esters of polyethylene glycol monoalkyl ether and phosphoric acid monomer, vinyl group-containing urethane formed from polyethylene glycol monoalkyl ether and isocyanate group-containing monomer, and macro-monomers having polyvinyl alcohol structures.

The number of ethylene oxy repeating moieties in the polyethylene glycol monoalkyl ether is preferably 8 to 50, more preferably 10 to 30. The number of carbon atoms in the alkyl group in the polyethylene glycol monoalkyl ether is preferably 1 to 20, more preferably 1 to 12.

Now, the condensation polymers described above (polyurethane, polyester, polyamide, polyurea and polycarbonate) are described in detail.

The polyurethane is synthesized generally by polyaddition reaction of a diol compound with a diisocyanate compound as the starting materials.

The diol compound includes e.g. non-dissociable diols and ionic diols.

The non-dissociable diols include e.g. ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexane dimethanol, hydroquinone, diethylene glycol, triethylene glycol, dipropylene glycol, tripropylene glycol, polyethylene glycol (average molecular weight=200, 300, 400, 600, 1000, 1500, 4000), polypropylene glycol (average molecular weight=200, 400, 1000), polyester polyol, 4,4'-dihydroxy-diphenyl-2,2-propane, and 4,4'-dihydroxydiphenyl sulfone.

The anionic group-containing diols described above include e.g. 2,2-bis(hydroxymethyl) propionic acid, 2,2-bis(hydroxymethyl) butanoic acid, 2,5,6-trimethoxy-3,4-dihydroxyhexanoic acid, 2,3-dihydroxy-4,5-dimethoxypentanoic acid and 3,5-bis(2-hydroxy ethyloxycarbonyl) benzene sulfonic acid as well as salts thereof.

The diisocyanates described above include e.g. methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenyl methane diisocyanate, 3,3'-dimethyl biphenylene diisocyanate, 4,4'-biphenylene diisocyanate, dicyclohexyl methane diisocyanate, and methylenebis(4-cyclohexyl isocyanate).

The polyester described above is synthesized generally by dehydration condensation between a dicarboxylic acid compound and a diol compound.

Examples of the dicarboxylic acids include oxalic acid, malonic acid, succinic acid, glutaric acid, dimethyl malonic acid, adipic acid, pimelic acid, α,α-dimethyl succinic acid, acetone dicarboxylic acid, sebacic acid, 1,9-nonane dicarboxylic acid, fumaric acid, maleic acid, itaconic acid, citraconic acid, phthalic acid, isophthalic acid, terephthalic acid, 2-butyl terephthalic acid, tetrachloroterephthalic acid, acetylene dicarboxylic acid, poly(ethylene terephthalate) dicarboxylic acid, 1,2-cyclohexane dicarboxylic acid, 1,4-cyclohexane dicarboxylic acid, ω-poly(ethylene oxide) dicarboxylic acid, and p-xylylene dicarboxylic acid.

For polycondensation reaction with the diol compound, these compounds may be used in the form of alkyl dicarboxylate (e.g., dimethyl dicarboxylate), dicarboxylic acid chloride, or acid anhydride such as maleic anhydride, succinic anhydride and phthalic anhydride.

Preferable examples of the sulfonic acid group-containing dicarboxylic acid and diol compounds include sulfophthalic acids (3-sulfophthalic acid, 4-sulfophthalic acid, 4-sulfoisophthalic acid, 5-sulfoiosophthalic acid, 2-sulfoterephthalic acid), sulfosuccinic acid, sulfonaphthalene dicarboxylic acids (4-sulfo-1,8-naphthalene dicarboxylic acid, 7-sulfo-1,5-naphthalene dicarboxylic acid etc.) and 3,5-bis(2-hydroxy ethyloxycarbonyl) benzene sulfonic acid as well as salts thereof.

As the diol compound, the same diol compounds as those described above for the starting materials of the polyurethane can be mentioned.

Typical methods of synthesizing the polyester described above include a method of condensation reaction of the diol compound with the dicarboxylic acid or a derivative thereof, a method of condensation of hydroxycarboxylic acids (e.g., 12-hydroxystearic acid), a method of ring-opening polymerization of a cyclic ether with a lactone (detailed in Lecture 6 on Polymerization Reaction, Ring-Opening Polymerization (I) (in Japanese), authored by Takeo Saegusa (Kagaku Dojin, 1971).

The above-mentioned polyamide can be obtained by polycondensation of a diamine compound with a dicarboxylic acid compound, by polycondensation of aminocarboxylic acid compounds, or by ring-opening polymerization of monomers such as lactams.

The diamine compound includes e.g. ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethyl piperazine, 4,4'-diaminodiphenyl ether, 3,3'-diaminodiphenyl sulfone, xylylenediamine, etc.

As the dicarboxylic acid compound described above, the same dicarboxylic acid compounds as those described above for the starting materials of the polyester can be mentioned.

The aminocarboxylic acid compound described above includes e.g. glycine, alanine, phenylalanine, ω-aminohexanoic acid, ω-aminodecanoic acid, ω-aminoundecanoic acid and anthranilic acid.

The monomer used in the ring-opening polymerization described above includes e.g. ε-caprolactam, azetidinone and pyrrolidone.

The polyurea can be obtained generally by polyaddition reaction of a diamine compound with a diisocyanate compound or by ammonia-eliminating reaction of the diamine compound with urea.

As the diamine compound, the same diamine compounds as those described above for the starting materials of the polyamide can be mentioned.

As the diisocyanate compound, the same diisocyanate compounds as those described above for the starting materials of the polyurethane can be mentioned.

The polycarbonate can be obtained generally by reacting a diol compound with phosgene or a carbonate derivative (e.g., aromatic esters such as diphenyl carbonate etc.).

As the diol compound, the same diol compounds as those described above for the starting materials of the polyurethane can be mentioned.

As compounds described above to form an oil-soluble polymer, one kind of compound may be used or two or more kinds of compounds may be used in combination in an arbitrary ratio depending on various objects (e.g. regulation of glass transition temperature (Tg) of the polymer, solubility thereof, compatibility thereof with dyes, and stability of the dispersion).

The oil-soluble polymers described above are preferably the polymers containing ionic group, more preferably the polymers containing carboxyl group and/or sulfonic acid group as the ionic group, particularly preferably the polymers containing carboxyl group.

An ionic group can be introduced by a reaction in which an acid anhydride (for example, maleic anhydride) acts on a reactive group such as a hydroxy group or an amino group after polymerization for producing the respective polymers.

The amount of the ionic group is preferably from 0.1 to 3.0 mmol/g.

If the amount is small, a self-emulsifying property of the polymer is small. If the amount is large, the water solubility of the polymer rises and the polymer tends to be unsuitable for dispersion of the dye.

Further, the ionic group may be alkali metals (e.g., Na, K etc.) or ammonium ion salts as the anionic group described above, or salts of organic acids (e.g., acetic acid, propionic acid, methane sulfonic acid) and inorganic acids (hydrochloric acid, sulfuric acid etc.) as the cationic group described above.

The oil-soluble polymers described above are particularly preferably the vinyl polymer, polyurethane, polyester etc. for impartment of compatibility with the oil-soluble dyes, impartment of excellent dispersion stability, and easy introduction of ionic groups.

Specific examples (PA-1) to (PA-41) of the vinyl polymer are listed below. Ratios in following parentheses indicate ratios by mass. The present invention is not limited to these specific examples.

(PA-1) methyl methacrylate/ethyl acrylate copolymer (50:50)
(PA-2) n-butyl acrylate/styrene copolymer (50:50)
(PA-3) poly n-buytl methacrylate
(PA-4) polyisopropyl methacrylate
(PA-5) poly(4-tert-butylphenyl acrylate)
(PA-6) (n-butyl methacrylate/N-vinyl-2-pyrrolidone copolymer(90:10)
(PA-7) methyl methacrylate/vinyl chloride copolymer (70:30)
(PA-8) isobutyl methacrylate/n-butyl acrylate copolymer (55:45)
(PA-9) vinyl acetate/acrylamide copolymer(85:15)
(PA-10) n-butyl acrylate/methyl methacrylate/n-butyl methacrylate copolymer(35:35:30)
(PA-11) ethyl methacrylate/n-butyl acrylate copolymer (70:30)
(PA-12) tert-butylmethacrylamide/methyl methacrylate/acrylic acid copolymer (60:30:10)
(PA-13) n-butyl acrylate/acrylic acid copolymer (80:20)
(PA-14) sec-butyl acrylate/acrylic acid copolymer (85:15)
(PA-15) isopropyl acrylate/acrylic acid copolymer(90:10)
(PA-16) n-butyl acrylate/2-hydroxyethyl methacrylate/acrylic acid (85:5:10)
(PA-17) isobutyl methacrylate/tetrahydrofurfuryl acrylate/acrylic acid copolymer(60:30:10)
(PA-18) n-butyl methacrylate/1 H,1 H,2 H,2 H-perfluorodecyl acrylate/acrylic acid (75:20:5)
(PA-19) methyl methacrylate/n-butyl acrylate/acrylic acid (50:45:5)
(PA-20) 3-methoxybutyl methacrylate/ styrene/ acrylic acid copolymer (35:50:15)
(PA-21) ethyl acrylate/phenyl methacrylate/acrylic acid copolymer (72:15:13)
(PA-22) isobutyl methacrylate/methacrylic ester of polyethylene glycol monomethyl ether (repetition number of ethyleneoxy chains: 23)/acrylic acid (70:20:10)
(PA-23) ethyl methacrylate/acrylic acid copolymer (95:5)
(PA-24) isobutyl acrylate/p-methoxystyrene/acrylic acid copolymer (75:15:10)
(PA-25) isobutyl acrylate/N-vinylpyrrolidone/acrylic acid copolymer (60:30:10)
(PA-26) 2,2,2-tetrafluoroethyl methacrylate/methyl methacrylate/methacrylic acid (25:60:15)
(PA-27) ethyl methacrylate/2-ethyoxyethyl methacrylate/methacrylic acid copolymer (70:15:15)
(PA-28) tert-octylacrylamide/n-propyl methacrylate/methacrylic acid copolymer(20:65:15)
(PA-29) n-butyl methacrylate/ diphenyl-2-methacryloyloxyethyl phosphate/methacrylic acid copolymer (80:5:15)
(PA-30) n-butyl methacrylatel phenyl acrylamide/methacrylic acid copolymer (70:15:15)
(PA-31) n-butyl methacrylate/ N-vinylpyrrolidone/ methacrylic acid copolymer (70:15:15)
(PA-32) n-butyl methacrylate/styrenesulfonic acid copolymer (90:10)
(PA-33) isobutyl methacrylate/styrenesulfonic acid copolymer (90:10)
(PA-34) n-butyl methacrylate/2-acrylarnidel/2-methylethane sulfonic acid copolymer (90:10)
(PA-35) isobutyl acrylate/n-butyl methacrylate/2-acrylamide-2-methylethanesulfonic acid copolymer (70:20:10)
(PA-36) ethyl acrylate/tert-butyl methacrylate/2-acrylamide-2-methylpropanesulfonic acid copolymer (60:30:10)
(PA-37) tert-butyl acrylate/tetrahydrofurfuryl acrylate/2-methylpropanesulfomic acid copolymer (50:40:10)
(PA-38) tert-butyl acrylate/methacrylic ester of polyethylene glycol monomethyl ether (repetition number of ethyleneoxy chains: 23)/2-acrylamide-2-methylpropanesulfonic acid copolymer (60:30:10)
(PA-39) isobutyl acrylate/ N-vinylpyrrolidone/2-acrylamide-2-methylpropanesulfonic acid copolymer (60:30:10)
(PA-40) n-butyl methacrylatel sodium 2-acrylamide-2-methylpropanesulfonate copolymer (98:2)
(PA-41) n-butyl methacrylate/tert-butyl methacrylate/2-acrylamidde-2-methylbutanesulfonic acid copolymer (50:35:15)

Specific examples (PC-1)–(PC-21) of the above-mentioned condensed polymer are listed up in the form of ingredient monomers thereof. However, examples (PC-17)–(PC-21) are listed up in a polymer form. The present invention is not limited to these examples.

Acidic groups in the respective polymers are indicated in a non-dissociated form. Products by condensation reaction of polyester, polyamide or the like are represented by names of dicarboxylic acid, diol, diamine, hydroxycarboxylic acid, aminocarboxylic acid or the like. Ratios in following parentheses and n, x and y in examples (PC-17) to (PC-21) indicate ratios by mole percentage of respective components.

(PC-1) toluene diisocyanate/ethylene glycol/1,4-butanediol(50/15/35)

(PC-2) toluene diisocyanate/hexamethylene diisocyanate/ethylene glycol/polyethylene glycol (Mw=600)/1,4-butanediol (40/10/20/10/20)

(PC-3) 4,4'-diphenylmethane diisocyanate/hexamethylene diisocyanate/tetraethylene glycol/ethylene glycol/2,2-bis(hydroxymethyl)propionic acid (40/10/20/20/10)

(PC-4) 1,5-naphthalene diisocyanate/butanediol/4,4'-dihydroxy-diphenyl-2,2'-propane/polypropylene glycol (Mw=400)/2,2-bis(hydroxymethyl)propionic acid (50/20/5/10/15)

(PC-5) isophorone diisocyanate/diethylene glycol/neopentyl glycol/2,2-bis(hydroxymethyl)propionic acid (50/20/20/10)

(PC-6) diphenylmethane diisocyanate/hexamethylene diisocyanate/tetraethylene glycol/butanediol/3,5-bis(2-hydroxy ethyloxycarbonyl) benzene sulfonic acid (40/10/10/33/7)

(PC-7) terephthalic acid/isophthalic acid/cyclohexanedimethanol/1,4-butanediol/ethylene glycol (25/25/25/15/10)

(PC-8) terephthalic acid/isophthalic acid/4,4'-dihydroxy-diphenyl-2,2-propane/tetraethylene glycol/ethylene glycol (30/20/20/15/15)

(PC-9) terephthalic acid/isophthalic acid/1,4-benzenedimethanol/diethylene glycol/neopentyl glycol (25/25/25/15/10)

(PC-10) terephthalic acid/ isophthalic acid/5-sulfoisophthalic acid/ethylene glycol/neopentyl glycol (24/24/2/25/25)

(PC-11) 11-aminoundecanoic acid (100)

(PC-12) a reaction product of poly(12-aminodecanoic acid) and maleic anhydride (PC-13) hexamethylenediamine/adipic acid (50/50)

(PC-14) N,N-dimethylethylenediamine/adipic acid/cyclohexanedicarboxylic acid (50/20/30)

(PC-15) toluene diisocyanate/4,4'-diphenylmethane diioscyanate/hexamethylenediamnine (30/20/50)

(PC-16) hexamethylenediamnine/nonamethylenediamine/urea (25/25/50)

PC-17

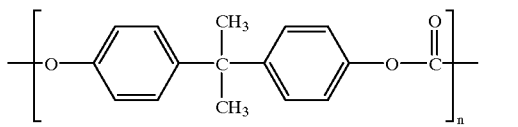

PC-18

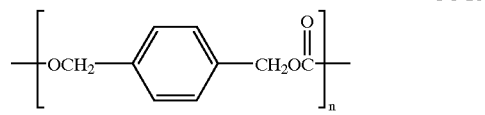

PC-19

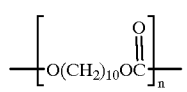

PC-20

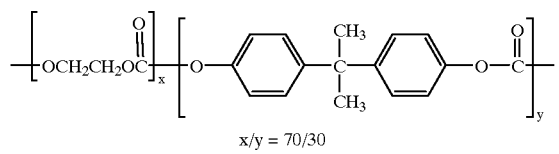

x/y = 70/30

PC-21

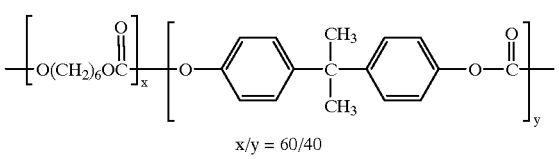

x/y = 60/40

The molecular weight (Mw) of the oil-soluble polymer is usually from 1000 to 200000, and preferably from 2000 to 50000.

If the molecular weight is below 1000, it becomes difficult to obtain a stable coloring composition. If the molecular weight is over 200000, solubility of the oil-soluble polymer in the organic solvent deteriorates and viscosity of this solution increases so that it becomes difficult for the organic solvent to disperse.

The following will describe the process for producing a coloring composition.

The coloring composition of the present invention can be produced by dispersing the oil-soluble dye and the oil-soluble polymer, in the form of coloring particulates, into a water-based solvent (a liquid containing at least water).

Examples of this production process include a process of preparing a latex of the oil-soluble polymer beforehand, and then impregnating the latex with the oil-soluble dye, or a co-emulsification dispersion process.

Of theses processes, the co-emulsification dispersion process is preferred. As the co-emulsification dispersion process, preferred is a process of performing either of addition of water to an organic solvent containing the oil-soluble polymer and the oil-soluble dye, or addition of such an organic solvent to water, and then emulsifying the organic solvent to make the same into particles.

The latex means a dispersion of particulates of the water-insoluble but oil-soluble polymer in a water-based medium. The dispersion may be in any form of the oil-soluble polymer emulsified, emulsion-polymerized or dispersed as micelles in the water-based medium, or dispersed in the form of molecule with a molecular chain having a partially hydrophilic structure in the oil-soluble polymer.

Now, the method of preparing the oil-soluble polymer latex and then impregnating it with the oil-soluble dye is described.

A first example of this method comprises the first step of preparing of a latex of the oil-soluble polymer, the second step of preparing a dye solution having the oil-soluble dye dissolved in an organic solvent, and the third step of mixing the dye solution with the latex of the oil-soluble polymer to prepare a coloring composition.

A second example of this method comprises the step of preparing a latex of the oil-soluble polymer, the second step of preparing a dye solution having the oil-soluble dye dissolved in an organic solvent and mixing this dye solution with a liquid containing at least water to prepare a dispersion of the dye particulates, and the third step of mixing the latex of the oil-soluble polymer and the dispersion of the dye particulates, to prepare a coloring composition.

As a third example of this method, a method described in JP-A No. 55-139471 is mentioned.

Now, the method of co-emulsification and dispersion is described.

A first example of this method comprises the first step of preparing a solution having the oil-soluble dye and the oil-soluble polymer dissolved in an organic solvent and the second step of mixing said organic solvent containing the oil-soluble polymer and dye with a liquid containing at least water to prepare a coloring composition.

A second example of this method comprises the first step of preparing a dye solution having the oil-soluble dye dissolved in an organic solvent, the second step of preparing an oil-soluble polymer solution having the oil-soluble polymer dissolved in an organic solvent, and the third step of mixing the dye solution and the oil-soluble polymer with a liquid containing at least water to prepare a coloring composition.

A third example of this method comprises the first step of preparing a dye solution having the oil-soluble dye dissolved in an organic solvent and then mixing this dye solution with a liquid containing at least water to prepare a dispersion of the dye particulates, the second step of preparing an oil-soluble polymer solution having the oil-soluble polymer dissolved in an organic solvent and then mixing the oil-soluble polymer solution with a liquid containing at least water to prepare a dispersion of the oil-soluble polymer particulates, and the third step of mixing the dispersion of the dye particulates with the dispersion of the oil-soluble polymer particulates to prepare a coloring composition.

A fourth example of this method comprises the first step of preparing a dye solution having the oil-soluble dye dissolved in an organic solvent and then mixing this dye solution with a liquid containing at least water to prepare a dispersion of the dye particulates, the second step of preparing an oil-soluble polymer solution having the oil-soluble polymer dissolved in an organic solvent, and the third step of mixing the dispersion of the dye particulates and the solution of the oil-soluble polymer to prepare a coloring composition.

A fifth example of this method comprises the step of mixing a liquid containing at least water with the oil-soluble dye and the oil-soluble polymer to directly prepare a coloring composition.

The content of the oil-soluble polymer in the coloring composition is preferably 10 to 1000 mass parts, more preferably 50 to 600 mass parts, relative to 100 mass parts of the oil-soluble dye.

If the content of the polymer is less than 10 mass parts, formation of a fine and stable dispersion tends to be difficult, while if the content is more than 1000 mass parts, there is the tendency that the ratio of the oil-soluble dye in the dispersion of the coloring particulates is decreased, thus reducing allowance in compounding design when the dispersion of the coloring particulates is used as an aqueous ink.

The organic solvent used in production of the coloring composition is not particularly limited, and can be selected as necessary depending on the solubility of the oil-soluble dye and the polymer, and mention is made of ketone type solvents such as acetone, methyl ethyl ketone and diethyl ketone, alcohol type solvents such as methanol, ethanol, 2-propanol, 1-propanol, 1-butanol and tert-butanol, chlorine type solvents such as chloroform and methylene chloride, aromatic solvents such as benzene and toluene, ester type solvents such as ethyl acetate, butyl acetate and isopropyl acetate, ether type solvents such as diethyl ether, tetrahydrofuran and dioxane, and glycol ether type solvents such as ethylene glycol monomethyl ether and ethylene glycol dimethyl ether.

These organic solvents may be used singly or in combination thereof. Depending on the solubility of the dye and the oil-soluble polymer, the solvent may be mixed with water prior to use.

The amount of the organic solvent used is not particularly limited insofar as the effect of the present invention is not impaired, but its amount is preferably 10 to 2000 mass parts, more preferably 100 to 1000 mass parts, relative to 100 mass parts of the oil-soluble polymer.

If the amount of the organic solvent used is less than 10 mass parts, a fine and stable dispersion of coloring particulates tends to be hardly formed because of higher viscosity of the organic phase, while if it is more than 2000 mass parts, the cumbersome step of desolvation and concentration for removal of the organic solvent is essential, thus reducing allowance in compounding.

If the solubility of the organic solvent in water is 10% or less or the vapor pressure of the organic solvent is larger than that of water, the organic solvent is preferably removed for stability of the dispersion of the coloring particulates.

The organic solvent can be removed at 10 to 100° C. under normal pressures to reduced pressure and preferably at 40 to 100° C. under normal pressures or at 10 to 50° C. under reduced pressure.

The coloring composition may contain additives selected as necessary depending on the object insofar as the effect of the present invention is not impaired.

The additives include e.g. a neutralizing agent, a dispersant and a dispersion stabilizer.

When the oil-soluble polymer has the ionic group not neutralized, the neutralizing agent can be used preferably for pH adjustment of the dispersion of the coloring particulates, for regulation of the self-emulsification ability and for impartment of dispersion stability. The neutralizing agent may be added to the polymer before, during or after preparation of its dispersion.

The neutralizing agent includes organic bases and inorganic alkalis for anionic groups or organic acids and inorganic acids for cationic groups.

Among the neutralizing agents for anionic groups, the organic bases include triethanolamine, diethanolamine, N-methyl diethanolamine and dimethyl ethanolamine, while the inorganic alkalis include alkali metal hydroxides (e.g., sodium hydroxide, lithium hydroxide, potassium hydroxide etc.), carbonates (e.g., sodium carbonate, sodium hydrogen carbonate etc.), and ammonia.

Examples of the neutralizing agent for the cationic group include organic acids (for example, oxalic acid, formic acid, acetic acid, methanesulfonic acid, p-toluenesulfonic acid and the like) and inorganic acids (for example, hydrochloric acid, phosphoric acid, and sulfuric acid).

From the viewpoint of improving the dispersion stability of the coloring composition, the neutralizing agent is added so as to adjust the dispersion to pH 4.5–10.0, more preferably pH 6–10.0.

The dispersant and the dispersion stabilizer described above may be added to any one of the oil-soluble polymer latex, the oil-soluble polymer solution, the dye solution and the liquid containing at least water, but these are added preferably to the oil-soluble polymer dispersion and/or the oil-soluble polymer solution, the dye solution or the liquid containing at least water before preparation of the dye particulates dispersion of the present invention.

The dispersion and the dispersion stabilizer include cationic, anionic and nonionic surfactants, water-soluble or water-dispersible low molecular compounds, oligomers etc.

The amount of the dispersion and the dispersion stabilizer added is 0 to 100% by mass, preferably 0 to 20% by mass, relative to the total amount of the oil-soluble dye and the oil-soluble polymer.

The coloring composition preferably contains a high boiling 7.point organic solvent that will be specifically described later.

The content of the high boiling point organic solvent in the coloring composition is preferably 1 to 1000 mass parts, more preferably 10 to 400 mass parts, relative to 100 mass parts of the oil-soluble dye. The high boiling point organic solvent may be used alone or in a combination of two or more.

The amount of the coloring particulates in the coloring composition is preferably from 1 to 45% and more preferably from 2 to 30% by mass. This amount can be appropriately adjusted by dilution, evaporation, ultrafiltration or the like.

The average particle size of the coloring particulates is preferably from 1 to 500 nm and more preferably from 3 to 300 nm. Particle size distribution is not limited, and may be broad or monodispersive. The particle size and the particle size distribution can be adjusted by centrifugal separation, filtration or the like.

-High boiling point organic solvent-

The boiling point of the high boiling point organic solvent must be 150° C. or higher, and is preferably 170° C. or higher, so as to maintain preservation stability of images and inks.

The dielectric constant of the high boiling point organic solvent must be from 3 to 12, and is preferably from 4 to 10, in order to improve solubility of the dye. The dielectric constant means a dielectric constant relative to a vacuum at 25° C.

The type of the high boiling point organic solvent is not limited, and can be selected depending on purposes of this solvent. Examples thereof include compounds described in U.S. Pat. No. 2,322,027. Preferred examples thereof include high boiling point organic solvents composed of phosphates, aliphatic acid esters, phthalic esters, benzoic esters, phenols and amides.

As the high boiling point organic solvents, compounds represented by the following formulae [S-1]–[S-9] are particularly preferable.

Formula (S-1)

Formula (S-2)

Formula (S-3)

Formula (S-4)

Formula (S-5)

Formula (S-6)

Formula (S-7)

Formula (S-8)

Formula (S-9)

In the formula [S-1], $R^{30}$, $R^{31}$ and $R^{32}$ each independently represents an aliphatic group or an aryl group. Symbols a, b, and c each independently represents 0 or 1.

In the formula [S-2], $R^{33}$ and $R^{34}$ each independently represents an aliphatic group or an aryl group.

$R^{35}$ is a halogen atom (the halogen atom is F, Cl, Br or I, which is the same as in the following), an alkyl group, an alkoxy group, an aryloxy group, an alkoxycarbonyl group, or an aryloxycarbonyl group.

Symbol d is an integer of 0 to 3, and when d is 2 or more, $R^{35}$s may be the same or different.

In the formula [S-3], Ar represents an aryl group, and symbol e is an integer of 1 to 6. $R^{36}$ represents a hydrocarbon group or a hydrocarbon group having an ether bond therein, which is having e valences.

In the formula [S-4], $R^{37}$ represents an alipahtic group, and symbol f is an integer of 1 to 6. $R^{38}$ represents a hydrocarbon group or a hydrocarbon group having an ether bond therein, which is having f valences.

In the formula [S-5], symbol g is an integer of 2 to 6. $R^{39}$ represents a hydrocarbon group (except any aryl group) having g valences. $R^{40}$ represents an aliphatic group or an aryl group.

In the formula [S-6], $R^{41}$, $R^{42}$ and $R^{43}$ each independently represents a hydrogen atom, an aliphatic group or an aryl group. X represents —CO— or $SO_2$—. $R^{41}$ and $R^{42}$, or $R^{42}$ and $R^{43}$ may be bonded to each other to form a ring.

In the formula [S-7], $R^{44}$ represents an aliphatic group, alkoxycarbonyl group, an aryloxycarbonyl group, an alkylsulfonyl group, an arylsulfonyl group, an aryl group or a cyano group.

$R^{45}$ represents a halogen atom, an aliphatic group, an aryl group, an alkoxy group or an aryloxy group.

Symbol h is an integer of 0 to 3. In the case that h is 2 or more, $R^{45}$ s may be the same or different.

In the formula [S-8], $R^{46}$ and $R^{47}$ each independently represents an aliphatic group or an aryl group. $R^{48}$ is a halogen atom, an aliphatic group, an aryl group, an alkoxy group or an aryloxy group. Symbol i is an integer of 0 to 4. In the case that i is 2 or more, $R^{48}$s may be the same or different.

In the formula [S-9], $R^{49}$ and $R^{50}$ each independently represents an aliphatic group or an aryl group. Symbol j is 1 or 2.

When $R^{30}$ to $R^{35}$, $R^{37}$, $R^{40}$ to $R^{50}$ are aliphatic groups or groups containing an aliphatic group in the formulae [S-1] to [S-9], the aliphatic groups may be any one of straight chain, branched chain and cyclic forms, may contain an unsaturated bond, and may have a substituent. Examples of the substituent include a halogen atom, an aryl group, an alkoxy group, an aryloxy group, an alkoxycarbonyl group, a hydroxyl group, an acyloxy group and an epoxy group.

When $R^{30}$ to $R^{35}$, $R^{37}$, $R^{40}$ to $R^{50}$ are cyclic alipahtic groups, i.e., cycloalkyl groups, or groups containing a cycloalkyl group in the formulae [S-1] to [S-9], the cycloalkyl group may contain an unsaturated bond in its 3 to 8-membered ring or may have a substituent or a crosslinking group. Examples of the substituent include a halogen atom, an aliphatic group, a hydroxyl group, an acyl group, an aryl group, an alkoxy group, an epoxy group, and an alkyl group. Examples of the crosslinking group include a methylene group, an ethylene group, and an isopropylidene group.

When $R^{30}$ to $R^{35}$, $R^{37}$, $R^{40}$ to $R^{50}$ are aryl groups or groups containing an aryl group in the formulae [S-1] to [S-9], the aryl group may be substituted with a halogen atom, an aliphatic group, an aryl group, an alkoxy group, an aryloxy group, an alkoxycarbonyl group or the like.

When $R^{36}$, $R^{38}$ or $R^{39}$ is a hydrocarbon group in the formulae [S-3], [S-4] and [S-5], the hydrocarbon group may contain a cyclic structure (for example, a benzene ring, a cyclopentane ring or a cyclohexane ring), an unsaturated bond or a substituent. Examples of the substituent include a halogen atom, a hydroxyl group, an acyloxy group, an aryl group, an alkoxy group, an aryloxy group, and an epoxy group.

The following will describe particularly preferable high boiling point organic solvents in the present invention.

In the formula [S-1], $R^{30}$, $R^{31}$ and $R^{32}$ each represents an aliphatic group having 1–24 (preferably 4–18) carbon atoms (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl, or an aryl group having 6–24 (preferably 6–18) carbon atoms (for example, phenyl, cresyl, p-nonylphenyl, xylyl, cumenyl, p-methoxyphenyl and p-methoxycarbonylphenyl).

Symbols a, b and c each independently represents 0 or 1, and preferably a, b and c each represents 1.

In the formula [S-2], $R^{33}$ and $R^{34}$ each represents an aliphatic group having 1–24 (preferably 4–18) carbon atoms (for example, the same alkyl groups as described as $R^{30}$, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, and 1-methylcyclohexyl), or an aryl group having 6–24 (preferably 6–18) carbon atoms (for example, the same aryl groups as described as $R^{30}$, 4-t-butylphenyl, 4-t-octylphenyl, 1,3,5-trimethylphenyl, 2,4-di-t-butylphenyl, and 2,4-di-t-pentylphenyl).

$R^{35}$ represents a halogen atom (preferably Cl), an alkyl group having 1–18 carbon atoms (for example, methyl, isopropyl, t-butyl, and n-dodecyl), an alkoxy group having 1–18 carbon atoms (for example, methoxy, n-butoxy, n-octyloxy, methoxyethoxy, and benzyloxy), an aryloxy group having 6–18 carbon atoms (for example, phenoxy, p-tolyloxy, 4-methoxyphenoxy, 4-t-butylphenoxy), an alkoxycarbonyl group having 2–19 carbon atoms (for example, methoxycarbonyl, n-butoxycarbonyl and 2-ethylhexyloxycarbonyl), or an aryloxycarbonyl group having 6–25 carbon atoms.

Symbol d represents 0 or 1.

In the formula [S-3], Ar represents an aryl group having 6–24 (preferably 6–18) carbon atoms (for example, phenyl, 4-chlorophenyl, 4-methoxyphenyl, 1-naphthyl, 4-n-butoxyphenyl, and 1,3,5-trimethylphenyl), and e is an integer of 1–4 (preferably 1–3). $R^{36}$ represents a hydrocarbon having e valences and 2–24 (preferably 2–18) carbon atoms [for example, the same alkyl groups as described as $R^{33}$, a cycloalkyl group, an aryl group, —$(CH_2)_2$—, the following groups],

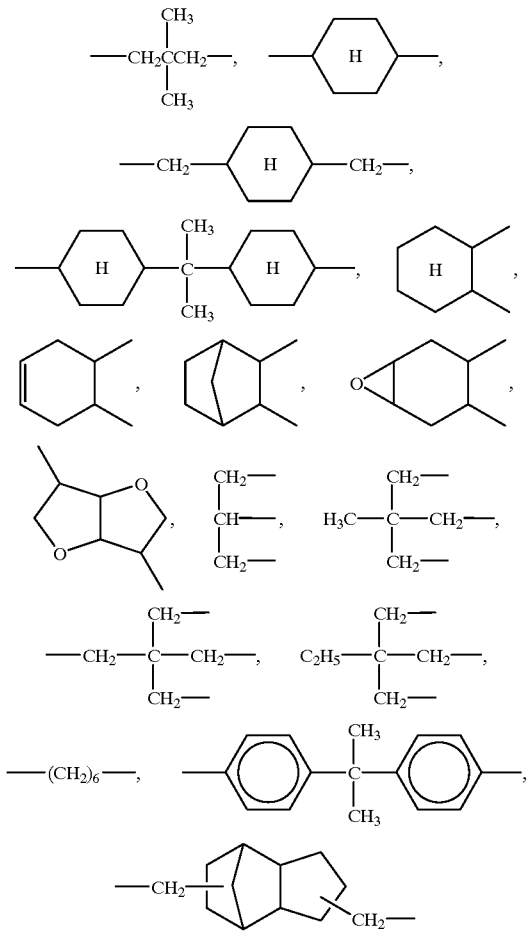

Alternatively, Ar represents a hydrocarbon group having e valences and 4–24 (preferably 4–18) carbon atoms, and having an ether bond therein [for example, —$CH_2CH_2OCH_2CH_2$—, —$CH_2CH_2(OCH_2CH_2)_3$—, —$CH_2CH_2CH_2OCH_2CH_2CH_2$—, and the following groups].

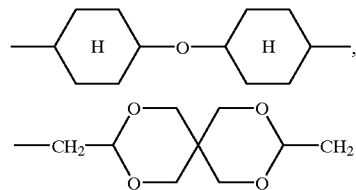

In the formula [S-4], $R^{37}$ represents an aliphatic group having 1–24 (preferably 3–17) carbon atoms (for example, n-propyl, 1-hydroxyethyl, 1-ethylpentyl, n-undecyl, pentadecyl, 8,9-epoxyheptadecyl, cyclopropyl, cyclohexyl, and 4-methylcyclohexyl), and f is an integer of 1–4 (preferably 1–3). $R^{38}$ represents a hydrocarbon group having f valences and 2–24 (preferably 2–18) carbon atoms, or a hydrocarbon group having f valences and 4–24 (preferably 4–18) carbon atoms and having an ether bond therein (for example, the same groups as described as $R^{36}$).

In the formula [S-5], g is 2–4 (preferably 2 or 3), and $R^{39}$ represnets a hydrocarbon group having g valences [for example, —CH$_2$—, —(CH$_2$)$_2$—, —(CH$_2$)$_4$—, —(CH$_2$)$_7$— and the following groups].

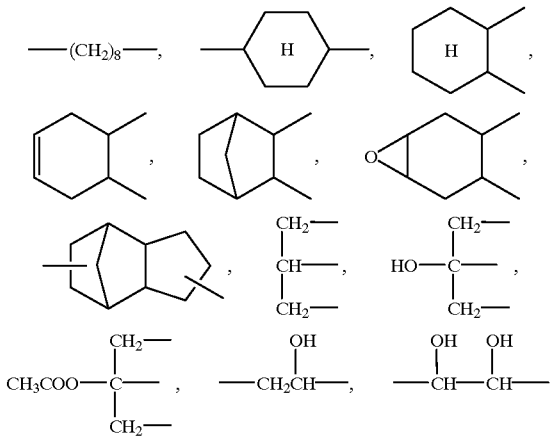

R$^{40}$ represents an aliphatic group having 1–24 (preferably 4–18) carbon atoms, or an aryl group having 6–24 (preferably 6–18) carbon atoms (for example, the same aliphatic groups and aryl groups as described as R$^{33}$).

In the formula [S-6], R represents an aliphatic group having 1–20 carbon atoms [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, and 4-methylcyclohexyl], or an aryl group having 6–24 (preferably 6–18) carbon atoms (for example, the same aryl groups as described as the above-mentioned Ar).

R$^{42}$ and R$^{43}$ each represents an aliphatic group having 1–24 (preferably 3–18) carbon atoms (for example, isopropyl, n-butyl, n-hexyl, 2-ethylhexyl, n-dodecyl, cyclopentyl, and cyclopropyl), or an aryl group having 6–18 (preferably 6–15) carbon atoms (for example, phenyl, 1-naphthyl and p-tolyl).

R$^{42}$ and R$^{43}$ may be bonded to each other to form, together with N, a pyrrolidine ring, a piperidine ring, or a morpholine ring. R$^{41}$ and R$^{42}$ may be bonded to each other to form a pyrrolidone ring.

X represents —CO— or —SO$_2$—, and is preferably —CO—.

In the formula [S-7], R$^{44}$ represents an aliphatic group having 1–24 (preferably 3–18) carbon atoms (for example, methyl, isopropyl, t-butyl, t-pentyl, t-hexyl, t-octyl, 2-butyl, 2-hexyl, $^2$-octyl, 2-dodecy, 2-hexadecyl, t-pentadecyl, cyclopentyl and cyclohexyl), an alkoxycarbonyl group having 2–24 (preferably 5–17) carbon atoms (for example, n-butoxycarbonyl, 2-ethylhexyloxycarbonyl, and n-dodecyloxycarbonyl), an alkylsulfonyl group having 1–24 (preferably 3–18) carbon atoms (for example, n-butylsulfonyl and n-dodecylsulfonyl), an arylsulfonyl group having 6–30 (preferably 6–24) carbon atoms (for example, p-tolylsulfonyl, p-dodecylphenylsulfonyl and p-hexadecyloxyphenylsulfonyl), an aryl group having 6–32 (preferably 6–24) carbon atoms (for example, phenyl and p-tolyl), or a cyano group.

R$^{45}$ represents a halogen atom (preferably Cl), an alkyl group having 1–24 (preferably 3–18) carbon atoms (for example, the same alkyl groups as described as R$^{44}$), a cycloalkyl group having 5–17 carbon atoms (for example, cyclopentyl and cyclohexyl), an aryl group having 6–32 (preferably 6–24) carbon atoms (for example, phenyl and tolyl), an alkoxy group having 1–24 (preferably 1–18) carbon atoms (for example, methoxy, n-butoxy, 2-ethylhexyloxy, benzyloxy, n-dodecyloxy and n-hexadecyloxy), and an aryloxy group having 6–32 (preferably 6–24) carbon atoms (for example, phenoxy, p-t-butylphenoxy, p-t-octylphenoxy, m-pentadecylphenoxy and p-dodecyloxyphenoxy), and h is an integer of 1 or 2.

In the formula [S-8], R$^{46}$ and R$^{47}$ are the same as R$^{42}$ and R$^{43}$, and R$^{48}$ is the same as R$^{45}$.

In the formula [S-9], R$^{49}$ and R$^{50}$ are the same as R$^{30}$, R$^{31}$ and R$^{32}$, and j is 1 or 2 and is preferably 1.

The following will list up specific examples of the high boiling point organic solvent (S-1 to S-23 as compounds represented by the formula [S-1], S-24 to S-39 as compounds represented by the formula [S-2], S-40 to S-44 as compounds represented by the formula [S-3], S-45 to S-50 as compounds represented by the formula [S-4], S-51 to S-58 as compounds represented by the formula [S-5], S-59 to S-67 as compounds represented by the formula [S-6], S-68 to S-75 as compounds represented by the formula [S-7], S-76 to S-79 as compounds represented by the formula [S-8], and S-80 to S-81 as compounds represented by the formula [S-9]).

Compound represented by the formula [S-1]

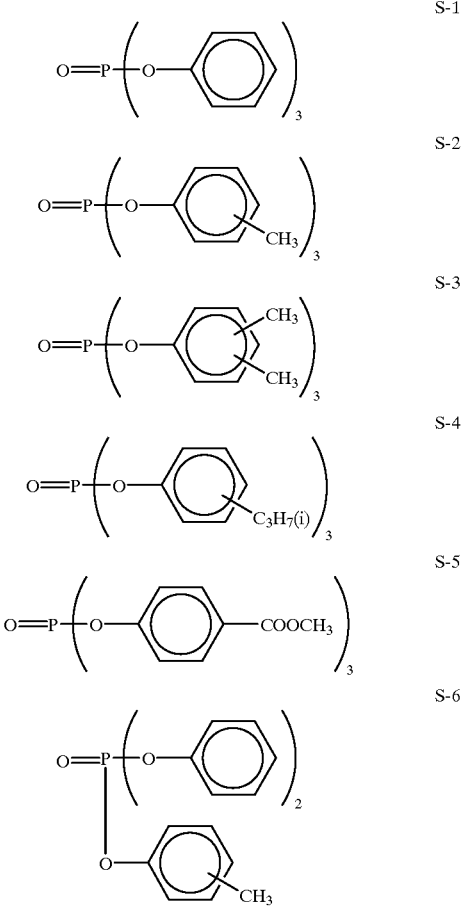

-continued

S-7

$$O=P(-O-\text{Ph})_2(OCH_2CHC_4H_9(n))$$
$$\quad\quad\quad\quad\quad\quad\quad\quad |C_2H_5$$

S-8

$O=P(OC_4H_9(n))_3$

S-9

$O=P(OC_6H_9(n))_3$

S-10

$O=P(OCH_2CHC_4H_9(n))_3$
$\quad\quad\quad\quad\quad |C_2H_5$

S-11

$O=P(OCH_2CHCH_2CCH_3)_3$
with CH$_3$ branches

S-12

$O=P(OC_{12}H_{25}(n))_3$

S-13

$O=P(OC_{16}H_{33}(n))_3$

S-14

$O=P(O(CH_2)_8CH=CHC_8H_{17}(n))_3$

S-15

$O=P(OCH_2CH_2Cl)_3$

S-16

$O=P(OCH_2CH_2OC_4H_9(n))_3$

S-17

$O=P(OCH_2CHCH_2Cl)_3$
$\quad\quad\quad\quad |Cl$

S-18

$O=P(-O-\text{Cy-H})_3$

S-19

$O=P(-O-\text{Cy-H-}C_4H_9(t))_3$

S-20

$(\text{Ph-O})_2\text{P}(=O)-O(CH_2)_6O-\text{P}(=O)(O-\text{Ph})_2$

S-21

$((n)C_4H_9O)_2P(=O)-O(CH_2)_6O-P(=O)(OC_4H_9(n))_2$

S-22

$((n)C_8H_{17}O)_3P=O$

S-23

$(n)C_8H_{17}-P(=O)(OC_8H_{17}(n))_2$

Compound represented by the formula [S-2]

S-24 phenyl ring with ortho -COOC$_4$H$_9$(n), -COOC$_4$H$_9$(n)

S-25 phenyl ring with ortho -COOC$_7$H$_{15}$ (branched), -COOC$_7$H$_{15}$ (branched)

S-26 phenyl ring with ortho -COOCH$_2$CHC$_4$H$_9$(n) / C$_2$H$_5$, -COOCH$_2$CHC$_4$H$_9$(n) / C$_2$H$_5$

S-27 phenyl ring with ortho -COOC$_{12}$H$_{25}$(n), -COOC$_{12}$H$_{25}$(n)

S-28 phenyl ring with ortho -COOC(C$_2$H$_5$)$_3$, -COOC(C$_2$H$_5$)$_3$

S-29 phenyl ring with ortho -COOCH$_2$-Cy-H, -COOCH$_2$-Cy-H

S-30 phenyl ring with ortho -COO-Cy-H, -COO-Cy-H

S-31 phenyl ring with ortho -COO-(trimethylcyclohexyl), -COO-(trimethylcyclohexyl)

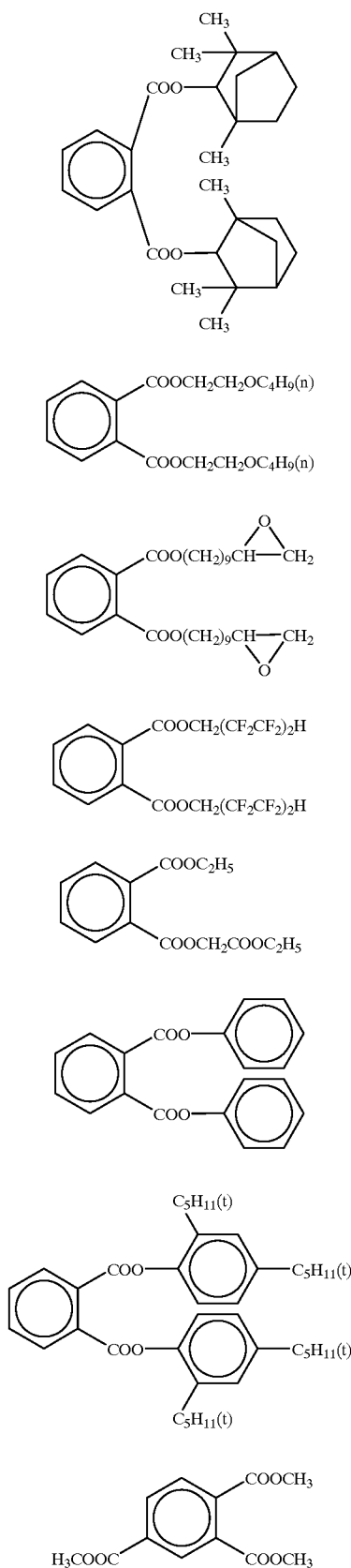
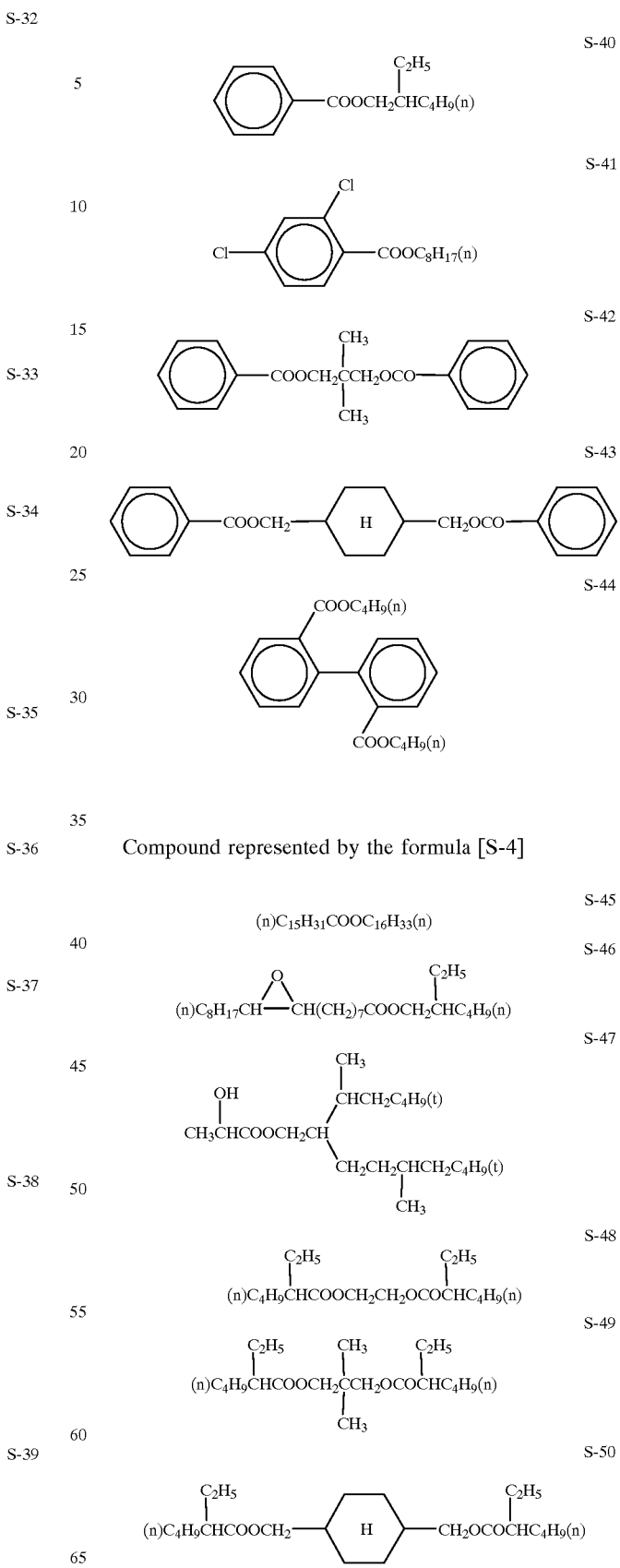

Compound represented by the formula [S-5]
S-51
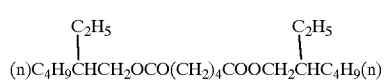
S-52
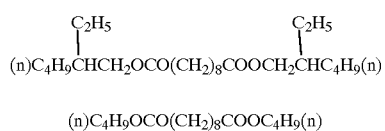
S-53
(n)C₄H₉OCO(CH₂)₈COOC₄H₉(n)
S-54
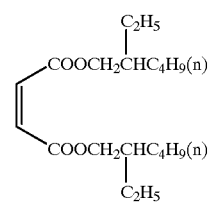
S-55
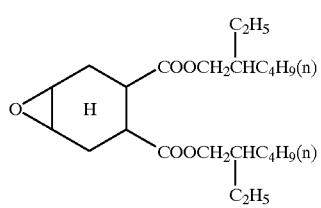
S-56
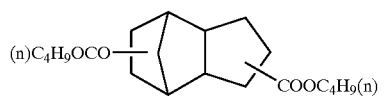
S-57
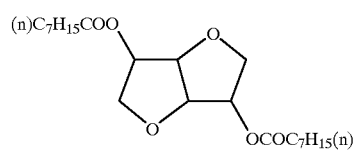
S-58
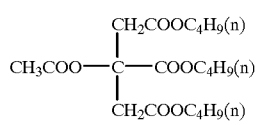
Compound represented by the formula [S-6]
S-59
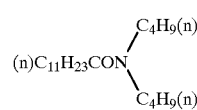
S-60
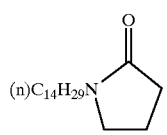
S-61
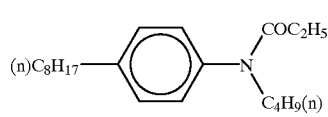
-continued
S-62
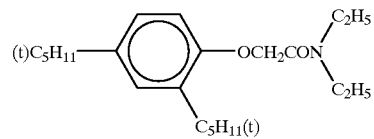
S-63
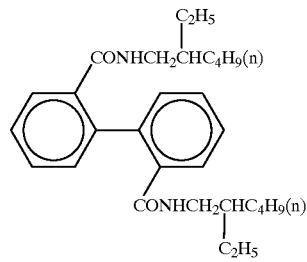
S-64
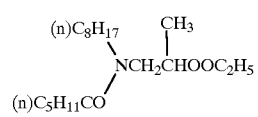
S-65
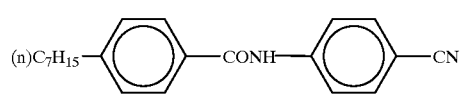
S-66
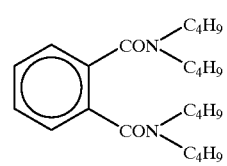
S-67
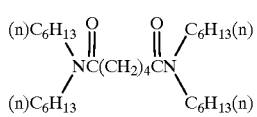
Compound represented by the formula [S-7]
S-68
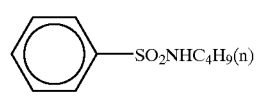
S-69
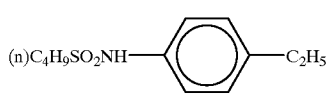
S-70
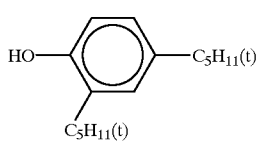
S-71
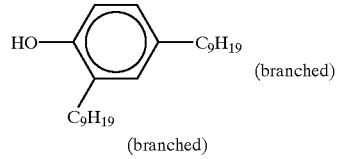

-continued

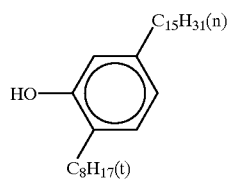

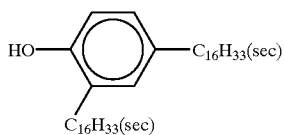

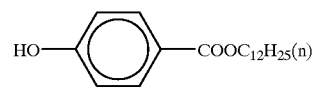

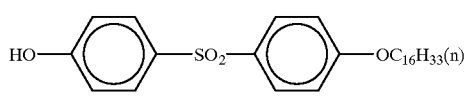

Compound represented by the formula [S-8]

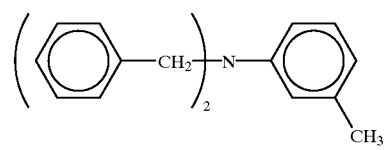

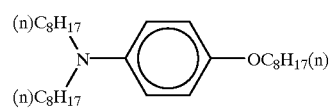

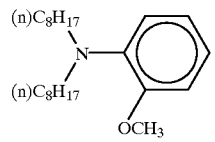

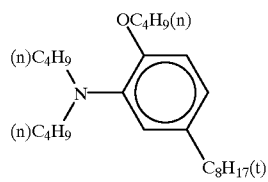

Compound represented by the formula [S-9]

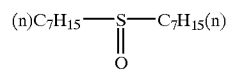

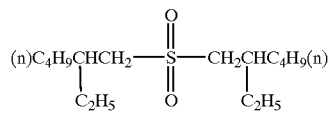

S-72

S-73

S-74

S-75

S-76

S-77

S-78

S-79

S-80

S-81

These high boiling point organic solvents may be used alone or in combination of two or more. Examples of the combination include a combination of tricresyl phosphate and dibutyl phthalate, a combination of trioctyl phosphate and di(2-ethylhexyl) cebacate.

Examples of the high boiling point organic solvents, other than the above-mentioned examples, and/or examples of methods of synthesizing these high boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-Nos. 276,319A, 286,253A, 289,820A, 309,158A, 309,159A, 309,160A, 509, 311A and 510,576A, East Germany Patent Nos. 147,009, 157,147, 159,573 and 225,240A, GB-2,091,124A, JP-A No. Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338, and so on.

In the present invention, it is possible to use the high boiling point organic solvent and a low boiling point organic solvent. The low boiling point organic solvent is an organic solvent having a boiling point of 150° C. or lower (usually, about 30° C. or higher) at normal pressure. Preferred examples thereof include esters (for example, ethyl acetate, butyl acetate, ethyl propionate, β-ethoxyethyl acetate, and methylcellosolve acetate), alcohols (for example, isopropyl alcohol, n-butyl alcohol, and sec-butyl alcohol), ketones (for example, methyl isobutyl ketone, methyl ethyl ketone, and cyclohexanone), amides (for example, dimethylformamide, and N-methylpyrrolidone), and ethers(for example, tetrahydrofuran and dioxane).

Emulsification and dispersion can be performed by dispersing an oil phase wherein the oil-soluble dye is dissolved in the high boiling point organic solvent, or a mixed solvent of the high boiling point organic solvent and the low boiling point organic solvent, into a water-based phase based on the water-based medium to form oily droplets (dispersed particles).

In general, the oily droplets (dispersed particles) are formed by adding the above-mentioned oil phase to the above-mentioned water-based phase. A so-called phase inversion emulsification, wherein the water-based phase is added to the oil phase, can be preferably used.

At the time of the emulsification and dispersion, if necessary, it is allowable to add additives such as a surfactant, a wetting agent, a dye stabilizer, an emulsion stabilizer, an antiseptic and an antifungal agent, described below, into at least one of the above-mentioned water-based phase and the above-mentioned oil phase.

Examples of the surfactant include anionic surfactants such as aliphatic acid salts, alkyl sulfate salts, alkylbenzenesulfonic acid salts, alkylnaphthalenesulfonic acid salts, dialkylsulfosuccinic acid salts, alkyl phosphate salts, naphthalenesulfonic acid formalin condensate, polyoxyethylenealkylsulfate salts and the like; nonionic surfactants such as polyoxyethylene alkyl ether, polyoxyethylenealkyl allyl ether, polyoxyethylene aliphatic acid esters, sorbitan aliphatic acid esters, polyoxyethylenesorbitan aliphatic acid esters, polyoxyethylenealkylamine, glycerin aliphatic acid esters, and oxyethyleneoxypropylene block copolymers; SURFYNOLS (made by Air Products & Chemicals), which is an acetylene type polyoxyethyleneoxide surfactant; amineoxide type amphoteric surfactants such as N,N-dimethyl-N-alkylamineoxide; and surfactants described in JP-A No. 59–157,636 pp. 37–38 and Research Disclosure No. 308119 (1989).

In the present invention, a water-soluble polymer, together with one or more of these surfactants, can be added to attain stabilization immediately after emulsification.

Examples of the water-soluble polymer include polyvinyl alcohol, polyvinylpyrrolidone, polyethyleneoxide, polyacrylic acid, polyacrylamide, and copolymers thereof. Natural water-soluble polymers such as polysaccharide, casein and gelatin are also preferable.

When the oil-soluble dye is dispersed by the emulsification and dispersion to prepare the water-based ink, it is particularly important to control the size of particles thereof. In order to improve color purity and density when an image is formed by ink jet recording, it is essential to make the average particle size of the dispersed particles in the coloring composition small. Volume average particle size is preferably 100 nm or less, and more preferably from 1 to 50 nm.

It has been found that the presence of coarse particles plays a very important role in printing performance. That is, it has been found that by blocking of nozzles of a printing head with coarse particles or forming of stains without blocking of nozzles, no ink jetting of an ink jet printing ink or uneven ink jetting is caused, which has a serious effect on printing performance. To prevent this problem, it is preferred that the number of particles having a size of 5 $\mu$m or more is set to 10 or less and that the number of particles having a size of 1 $\mu$m or more is set to 1000 or less, in 1 $\mu$l of the ink-jet ink that is produced.

As a method for removing the coarse particles, known centrifugal separation, precise filtration or the like can be used. The separating method may be performed immediately after the emulsification and dispersion, or performed after adding respective additives, for example, the wetting agent and the surfactant, to the emulsified and dispersed product just before charging the ink into an ink cartridge.

As an effective means for making the average particle size of the dispersed particles in the dye dispersed solution small or removing the coarse particles, an emulsifying and dispersing machine in which mechanical stirring is performed is preferably used.

As the emulsifying and dispersing machine, there can be used known machines, such as a simple stirrer, or an impeller stirring type, in-line stirring type, mill type (for example, colloid mill), or ultrasound wave type machine. In the present invention, a high-pressure emulsification and dispersion machine is preferred. A high-pressure homogenizer is particularly preferred.

Detailed mechanism of the high-pressure homogenizer is described in U.S. Pat. No. 4,533,254, JP-A No. 6-47264 and the like. Examples of commercially available homogenizers include GAULIN HOMOGENIZER (made by A. P. V Gaulin Inc.), MICROFLUIDIZER (made by Microfluidex Inc.) and ALTIMIZER (made by Sugino Machine Co., Ltd.).

A high-pressure homogenizer having a mechanism for preparing particles in a super-high-pressure jet flow, as described in U.S. Pat. No. 5,720,551, is particularly effective for the emulsification and dispersion of the present invention. An example of the emulsifying and dispersing machine using the super-high-pressure jet flow is DeBEE 2000 (Bee International Ltd.).

The pressure when the emulsifying and dispersing machine is used to carry out emulsification and dispersion is preferably 50 MPa or more (500 bar or more), more preferably 60 MPa or more (600 bar or more), and still more preferably 180 MPa or more (1800 bar or more).

In the present invention, it is particularly preferred that two or more emulsifying machines are used, utilizing, for example, a method of emulsifying raw materials with a stirring emulsifier and putting a resultant emulsion in a high-pressure homogenizer. It is also preferred to emulsify raw materials with such an emulsifier, and put the resultant emulsion into the high-pressure homogenizer after the addition of additives such as the wetting agent and the surfactant thereto, before the charging of the inkjet ink to be produced into the cartridge.

In a case that both the high boiling point organic solvent and the low boiling point organic solvent are emulsified and dispersed, it is preferred to remove almost all of the low boiling point organic solvent, in view of stability of the emulsion, safety and health.

As a method for removing almost all of the low boiling point solvent, it is possible to adopt any one of various known methods such as evaporation, vacuum evaporation, and ultrafiltration, depending on the type of the low boiling point solvent. The low boiling point solvent is preferably removed as early as possible after the emulsification.

Although the coloring composition of the present invention can be used in various fields, it can be used preferably for writing aqueous ink, aqueous printing ink, information-recording ink etc., particularly preferably for the ink-jet ink according to the present invention described below.

[Ink-Jet ink]

The ink-jet ink of the present invention contains the coloring composition of the present invention, and contains other components which are appropriately selected as needed.

Examples of the other components are known additives such as drying preventing agents, penetration accelerators, ultraviolet light absorbers, antioxidants, anti-fungal agents, pH adjusters, surface tension adjusting agents, anti-foaming agents, viscosity adjusting agents, dispersion aids, dispersion stabilizers, anti-rusting agents, chelating agents, and the like.

The drying preventing agent is suitably used for the purpose of preventing clogging due to the ink-jet ink drying at the ink jetting opening of the nozzle used in the ink jet recording method.

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink-jet ink is preferably 10 to 50% by mass.

The penetration accelerator is preferably used for the purpose of better penetration of the ink-jet ink into paper.

Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink-jet ink in an amount of 5 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No. 17643 (VII, I through J), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulas of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

Examples of the pH adjuster include hydroxides of alkali metals such as lithium hydroxide and potassium hydroxide; carbonates such as sodium carbonate and sodium hydrogencarbonate; inorganic bases such as potassium acetate, sodium silicate and disodium phosphate; and organic bases such as N-methyldiethanolamine and triethanolamine.

Examples of the surface tension adjusting agent include nonionic, cationic and anionic surfactants. For example, any surfactant that can be used in the above-mentioned emulsification and dispersion can be used. The surfactant used herein preferably has a solubility in water of 0.5% or more at 25° C.

As the dispersion aid and the dispersion stabilizer, the above-mentioned cationic, anionic and nonionic surfactants are preferred.

Examples of the antifoaming agent include fluorine-containing compounds, silicone type compounds, and chelate agents, a typical example of which is EDTA.

The pH of the ink-jet ink is preferably from 6 to 10 and more preferably from 7 to 10 from the viewpoint of improvement in preservation stability.

The surface tension of the ink-jet ink is preferably from 20 to 60 mN/m, and more preferably from 25 to 45 mN/m.

The viscosity of the ink-jet ink is preferably 30 mPa·s or less and more preferably 20 mPa·s or less.

The ink-jet ink of the present invention is favorably used in the following ink jet recording method of the present invention.

[Ink jet recording method]

In the ink jet recording method, the ink-jet ink of the present invention is used to record an image on an image-receiving material. Ink nozzles and so on used at this time are not particularly limited, and can be appropriately selected depending on the purpose of recording.

-Image-receiving material-

The type of the image-receiving material is not limited. This material is any known material on which images are formed. Examples thereof include plain paper; resin-coated paper; ink jet exclusive paper as described in, for example, JP-A Nos. 8-169172, 8-27693, 2-276670, 7-276789, 9-323475, 62-238783, 10-153989, 10-217473, 10-235995, 10-337947, 10-217597, 10-337947 and the like; films; paper that can also used for electrophotography; cloth; glass; metals; and ceramics.

In the present invention, recording paper and recording films comprising an image-receiving layer on a support are particularly preferred among the above-mentioned image-receiving materials.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 μm, and the weight thereof is preferably 10 to 250 g/m².

The image-receiving layer, as well as the backcoat layer which is selected as needed, may be directly laminated onto the support. Alternatively, the image-receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The image-receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene-butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the image-receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548, 564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent.

Examples of the cationic resin include polyamide-polyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the image-receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an anti-static agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like. The image-receiving layer may be comprised of one layer or may be comprised of two or more layers.

The thickness of the image-receiving layer is preferably from 10 to 50 $\mu$m and more preferably from 20 to 40 $\mu$m.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfade, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/ maleate salt copolymer, styrene/ acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258, 62-1316648 and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink-jet ink of the present invention can be applied to any ink jet recording method. For example, the ink-jet ink of the present invention can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Examples of the present invention will be described hereinafter. The present invention is not limited to these examples. "Part(s)", "%" and "% solid content" indicate respectively "part(s) by mass", "% by mass" and "% solid content by mass" hereinafter unless specified otherwise.

Example 1

<Manufacturing Example 1 (Preparation of Coloring Composition (B-1))>

A mixed solution of 4 parts of isopropyl alcohol, 6 parts of tert-butanol, 1.2 parts of the oil-soluble polymer (the above illustrative PA-14 (acid content of 2.07 mmol/g)), and 0.8 parts of the oil-soluble dye (the above illustrative C-26) was prepared. 2 mol/l sodium hydrate was added to the mixed solution gradually by an amount in which the acid of the oil-soluble polymer is neutralized. Then, the temperature of the mixture was raised to 80° C., and thereafter, 30 parts of water was added while stirring to the mixture. The solution was concentrated at 40° C. under reduced pressure, and thereby a coloring composition having 15% solid content was prepared.

This will be referred to hereinafter as "coloring composition (B-1)".

<Manufacturing Example 2 (Preparation of Coloring Composition (B-2))>

A mixed solution of 3 parts of ethyl acetate, 0.5 parts of cyclohexanone, 1.4 parts of the oil-soluble polymer (the above illustrative PA-19 (acid content of 0.69 mmol/g)), and 0.6 parts of the oil-soluble dye (the above illustrative C-26) was prepared. On the other hand, a mixed solution of 2 mol/l sodium hydrate having an amount in which the acid of the above-described oil-soluble polymer is neutralized, 15 parts of water, and 0.2 parts of bis (2-ethylhexyl) sodium sulfosuccinate was prepared.

The two types of mixed solutions were mixed and subjected to mix-emulsification in a homogenizer. Thereafter, the mixed solution was concentrated at 40° C. under reduced pressure, and thereby a coloring composition having 20% solid content was prepared.

This will be referred to hereinafter as "coloring composition (B-2)".

<Manufacturing Examples 3 to 10 (Preparation of Coloring Compositions (B-3 to B-10)>

The coloring compositions (B-3 to B-8) as shown in Table 1 were respectively prepared in accordance with a manufacturing method which is similar to that of Manufacturing Example 1, and the coloring compositions (B-9 and B-10) as shown in Table 1 were respectively prepared in accordance with a manufacturing method which is similar to that of Manufacturing Example 2.

<Manufacturing Example 11 (Preparation of Coloring Composition (B-11))>

A mixed solution of 4 parts of isopropyl alcohol, 6 parts of tert-butanol, 1.2 parts of the oil-soluble polymer (the above illustrative PA-19 (acid content of 0.69 mmol/g)), 0.5 parts of the oil-soluble dye (the above illustrative C-26), and 0.3 parts of the illustrative high boiling point organic solvent (S-2) was prepared. 2 mol/l sodium hydrate was added to the mixed solution gradually by an amount in which the acid of the oil-soluble polymer is neutralized. Then, the temperature of the mixture was raised to 80° C., and thereafter, 30 parts of water was added while stirring to the mixture. The solution was concentrated at 40° C. under reduced pressure, and thereby a coloring composition having 24% solid content was prepared.

This will be referred to hereinafter as "coloring composition (B-11)".

<Manufacturing Example 12 (Preparation of Coloring Composition (B-12))>

A mixed solution of 4 parts of isopropyl alcohol, 6 parts of tert-butanol, 1.2 parts of the oil-soluble polymer (the above illustrative PC-10 (acid content of 0.08 mmol/g)), 0.4 parts of the oil-soluble dye (the above illustrative C-26), 0.2 parts of the illustrative high boiling point organic solvent (S-2), and 0.2 parts of the illustrative high boiling point organic solvent (S-24) was prepared. 2 mol/l sodium hydrate was added to the mixed solution gradually by an amount in which the acid of the oil-soluble polymer is neutralized. Then, the temperature of the mixture was raised to 80° C., and thereafter, 30 parts of water was added while stirring to the mixture. The solution was concentrated at 40° C. under reduced pressure, and thereby a coloring composition having 30% solid content was prepared.

This will be referred to hereinafter as "coloring composition (B-12)".

TABLE 1

| Coloring composition No. | Oil-Soluble Polymer (1) | Molecular Weight Mw | Acid Content Mmol/g | Dye (2) | (1):(2) | Solid Content % by mass | Particle Size nm |
|---|---|---|---|---|---|---|---|
| B-1 | PA-14 | 12500 | 2.07 | C-26 | 6:4 | 15 | 48 |
| B-2 | PA-19 | 24000 | 0.69 | C-26 | 7:3 | 20 | 52 |
| B-3 | PA-22 | 23000 | 1.39 | C-3 | 7:3 | 20 | 55 |
| B-4 | PA-26 | 18000 | 1.74 | C-30 | 6:4 | 15 | 58 |
| B-5 | PA-19 | 24000 | 0.69 | C-1 | 6:4 | 15 | 62 |
| B-6 | PA-36 | 52000 | 0.48 | C-2 | 6:4 | 15 | 66 |
| B-7 | PC-10 | 16000 | 0.08 | C-10 | 6:4 | 15 | 73 |
| B-8 | PC-10 | 16000 | 0.08 | C-25 | 7:3 | 20 | 60 |
| B-9 | PA-26 | 18000 | 1.74 | C-28 | 7:3 | 20 | 79 |
| B-10 | PA-28 | 31000 | 1.74 | C-45 | 7:3 | 20 | 61 |
| B-11 | PA-19 | 24000 | 0.69 | C-26 | *1) | 24 | 55 |
| B-12 | PC-10 | 16000 | 0.08 | C-26 | *2) | 30 | 61 |
| B-13 | PA-19 | 24000 | 0.69 | H-2 | 6:4 | 15 | 75 |

*1) (1):(2):(S-2) = 12:5:3
*2) (1):(2):(S-2):(S-24) = 3:1:0.5:0.5

In Table 1, "Particle Size (nm)" denotes a volume average particle size (nm) (value which was measured by MICROTRACK UPA 150 manufactured by Nikkiso Co., Ltd.).

-Production of Sample 1-

8 parts of diethylene glycol, 8 parts of glycerin, 5 parts of triethylene glycol monobutyl ether, 0.5 parts of hexaethylene glycol monododecyl ether sulfate sodium salt, 0.5 parts of bis (2-ethylhexyl) sodium sulfosuccinate, and 36 parts of ion-exchange water were mixed with 42 parts of the coloring composition (B-1) which was prepared in the above Manufacturing Example 1. The mixed solution was filtered through a 0.45 μm filter, and thereby an aqueous ink for ink jet was produced.

-Production of Samples 2 to 12-

Except that the above-described coloring composition (B-1) in the production of the above-described Sample 1 was replaced with the coloring compositions (B-2 to B-12) which had been prepared in the above Manufacturing Examples 2 to 12, inks for ink jet were respectively produced in the same way as in the production of the above Sample 1.

-Production of Sample 13-

6.66 g of the oil-soluble dye (the above illustrative C-26) and 8.32 g of dioctyl sodium sulfosuccinate were dissolved at 70° C. in the mixture of 7.99 g of the illustrative high boiling point organic solvent (S-4), 20.0 g of the oil-soluble polymer (the above illustrative PA-19 (acid content of 0.69 mmol/g)), and 50 ml of ethyl acetate. During the dissolution, 2 mol/l sodium hydrate was gradually added to the solution by an amount in which the acid of the oil-soluble polymer is neutralized. 500 ml of deionized water was added to the solution while stirring with a magnetic stirrer, and an oil-in-water type product in which coarse particles are dispersed (hereinafter, "coarse particles dispersed product") was produced. Next, the coarse particles dispersed product was passed five times through MICROFLUIDIZER (MICROFLUIDEX INC) at pressure of 60 MPa (600 bar), such that fine particles were obtained. Further, the obtained emulsified product was desolvated by a rotary evaporator until odor of the ethyl acetate disappears. The fine emulsified product of the oil-soluble dye was obtained in this way, and then 140 g of diethylene glycol, 50 g of glycerin, 7 g of SURFYNOL 465 (Air Products & Chemicals), and 900 ml of deionized water were added to the product. Accordingly, an ink-jet ink was produced.

-Production of Comparative Sample 1-

10 parts of diethylene glycol, 8 parts of glycerin, 10 parts of tetraethylene glycol monobutyl ether, 1 part of diethanolamine, and 65 parts of ion-exchange water were mixed with 6 parts of the following comparative dye (H-1). The mixed solution was filtered through a 0.2 μm filter, and thereby an ink-jet ink was produced.

-Production of Comparative Sample 2-

In accordance with a manufacturing method which is similar to that of Manufacturing Example 2, a coloring composition (B-13) as shown in Table 1 was prepared using the following oil-soluble dye (H-2). Next, except that the above coloring composition (B-1) in the production of the above Sample 1 was replaced with the coloring composition (B-13), an ink-jet ink was produced in the same way as in the production of the above Sample 1.

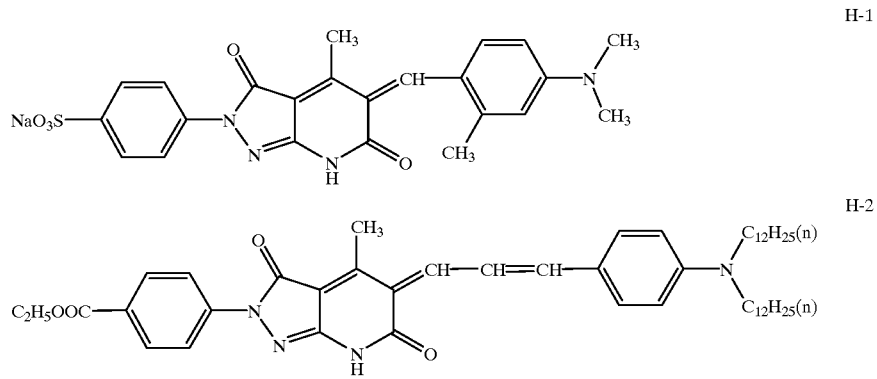

(Image recording and evaluation)

For the ink-jet ink of the above-mentioned Examples and Comparative Examples, the following evaluations were made. The results are shown in table 2.

In table 2, "Color tone", "Dependency on the kind of paper", "Water resistance", and "Light resistance" were items evaluated after an image was recorded on photo glossy paper (INK JET PAPER (PHOTO-GRADE), made by Fuji Photo Film Co., Ltd.), using each of the ink-jet ink and an ink jet printer (PM-700C, made by Seiko Epson Corp.).

<Color tone>

The recorded image was evaluated as A (good) or B (bad) by visual observation.

<Paper Dependence>

The color tone of the image recorded on the photo glossy paper and that of an image recorded on plain paper for PPC were compared. Ink exhibiting a small difference between the two was evaluated as A (good), and ink exhibiting a large difference between the two was evaluated as B (bad).

<Water resistance>

The photo glossy paper on which the image was recorded was dried at room temperature for 1 hour, and was then immersed in water for 30 seconds. The paper was naturally dried at room temperature, and bleeding was observed. Ink with no bleeding was ranked as A, and ink with slight bleeding was ranked as B. Ink with a lot of bleeding was ranked as C.

<Light resistance>

Using a weather-meter (ATLAS C. I65), xenon light (85000 lx) was radiated on the photo glossy paper on which the image was recorded. A reflectance density meter (X-RITE 310TR) was used to measure image densities before and after the xenon radiation. From resultant values, a colorant survival rate was calculated. The light resistance of the ink was evaluated from the survival rate. The reflectance densities were measured at three points: 1, 1.5 and 2.0.

Ink having a colorant survival rate of 70% or more at each of the densities was ranked as A, and ink having a colorant survival rate of less than 70% at one or two of the densities was ranked as B. Ink having a colorant survival rate of less than 70% at each of the densities was ranked as C.

TABLE 2

| No. | Coloring Composition | Color Tone | Paper Dependence | Water resistance | Light Resistance | Remarks |
|---|---|---|---|---|---|---|
| Sample 1 | B-1 | A | A | A | A | P. I. |
| Sample 2 | B-2 | A | A | A | A | P. I. |
| Sample 3 | B-3 | A | A | A | A | P. I. |
| Sample 4 | B-4 | A | A | A | A | P. I. |
| Sample 5 | B-5 | A | A | A | A | P. I. |
| Sample 6 | B-6 | A | A | A | A | P. I. |
| Sample 7 | B-7 | A | A | A | A | P. I. |
| Sample 8 | B-8 | A | A | A | A | P. I. |
| Sample 9 | B-9 | A | A | A | A | P. I. |
| Sample 10 | B-10 | A | A | A | A | P. I. |
| Sample 11 | B-11 | A | A | A | A | P. I. |
| Sample 12 | B-12 | A | A | A | A | P. I. |
| Sample 13 | — | A | A | A | A | P. I. |
| C.S. 1 | — | A | B | C | B | C. E. |
| C.S. 2 | B-13 | B | B | B | B | C. E. |

"P. I." = Present Invention
"C. E." = Comparative Example
"C. S." = Comparative Sample As is evident from table 2, the ink-jet ink of the present invention has a particle size sufficiently small to serve as an ink-jet ink, excellent color developability, color tone, water resistance and light resistance, and no paper dependence.

Example 2

-Production of Sample 101-

6.66 g of the oil-soluble dye (the above illustrative C-26) and 8.32 g of dioctyl sodium sulfosuccinate were dissolved at 70° C. in the mixture of 5.0 g of the illustrative high boiling point organic solvent (S-2), 8.3 g of the illustrative high boiling point organic solvent (S-11), and 50 ml of ethyl acetate. 500 ml of deionized water was added to the solution while stirring with a magnetic stirrer, and an oil-in-water type coarse particles dispersed product was produced.

Next, the coarse particles dispersed product was passed five times through MICROFLUIDIZER (MICROFLUIDEX INC) at pressure of 60 MPa (600 bar), such that fine particles were obtained. Further, the obtained emulsified product was desolvated by a rotary evaporator until odor of the ethyl acetate disappears. The fine emulsified product of the hydrophobic dye was obtained in this way, and then 140 g of diethylene glycol, 50 g of glycerin, 7 g of SURFYNOL 465 (Air Products & Chemicals), and 900 ml of deionized water were added to the product. Accordingly, an ink-jet ink was produced.

-Production of Samples 102 to 109-

Except that the oil-soluble dye (C-26) of Sample 101 was changed to oil-soluble dyes in Table 3, Samples 102 to 109 were produced in the same way as in Sample 101.

-Production of Comparative Sample 110-

Except that the oil-soluble dye (C-26) of Sample 101 was changed to the above comparative dye (H-2), Sample 110 was produced in the same way as in Sample 101.

The emulsified and dispersed inks of Samples 101 to 110 were obtained in this way, and the volume average particle sizes of the inks were measured using MICROTRACK UPA (manufactured by Nikkiso Co., Ltd.). Table 3 shows the results.

Next, the ink samples 101 to 110 and a comparative sample (light cyan ink for EPSON PM-700C, made by Epson Co., Ltd.) were evaluated in the same way as in Example 1. Table 3 shows the results.

TABLE 3

| Sample Number | Oil-Soluble Dye | Particle Size | Color Tone | Paper Dependence | Water resistance | Light resistance | Remarks |
|---|---|---|---|---|---|---|---|
| EPSON Light Cyan | — | — | A | A | B | B | C.E. |
| Sample 101 | C-26 | 40 | A | A | A | A | P.I. |
| Sample 102 | C-3 | 47 | A | A | A | A | P.I. |
| Sample 103 | C-30 | 54 | A | A | A | A | P.I. |
| Sample 104 | C-1 | 68 | A | A | A | A | P.I. |
| Sample 105 | C-2 | 58 | A | A | A | A | P.I. |
| Sample 106 | C-10 | 72 | A | A | A | A | P.I. |
| Sample 107 | C-25 | 44 | A | A | A | A | P.I. |
| Sample 108 | C-28 | 61 | A | A | A | A | P.I. |
| Sample 109 | C-45 | 76 | A | A | A | A | P.I. |
| Sample 110 | H-2 | 78 | B | B | B | B | C.E. |

"P.I." = Present Invention
"C.E." = Comparative Example

As can be seen clearly from Table 3, the inks for ink jet of the present invention have excellent color formation efficiency, excellent color tone, small paper dependence, excellent water resistance, and excellent light resistance.

Example 3

Inks which are the same as those produced in Example 2 were accommodated into cartridges of an ink jet printer BJ-F850 (manufactured by Canon Inc.). Images were printed onto photo glossy papers GP-301 manufactured by Canon Inc. by the above-described printing machine. When evaluations which are the same as those of Example 2 were made, the results which are the same as those of Example 2 were obtained.

What is claimed is:

1. An ink-jet ink which includes a coloring composition which contains an oil-soluble dye represented in the following formula (I):

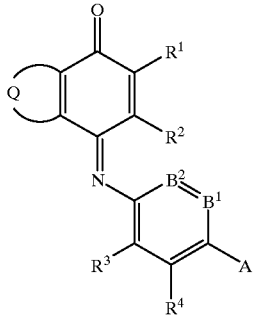

Formula (I)

wherein, $R^1$ and $R^2$ represent respectively independently one of a hydrogen atom, a halogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, and $NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently one of a hydrogen atom, an aliphatic group, and an aromatic group;

$R^1$ and $R^2$ may be connected to each other and form a ring;

A represents one of $-NR^5R^6$ and a hydroxyl group;

$R^5$ and $R^6$ represent respectively independently one of a hydrogen atom, an aliphatic group, an aromatic group, and a heterocyclic group;

$B^1$ represents one of $=C(R^7)-$ and $=N-$ and $B^2$ represents one of $-C(R^8)=$ and $-N=$;

$R^3$, $R^4$, $R^7$, and $R^8$ represent respectively independently one of a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $-NR^{65}CO_2R^{66}$, $-COR^{67}$, $-NR^{68}COR^{69}$, and $NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently one of a hydrogen atom, an aliphatic group, and an aromatic group;

$R^3$ and $R^4$, $R^4$ and $R^5$, $R^5$ and $R^6$, $R^6$ and $R^7$, and $R^7$ and $R^8$ may be combined with each other and form rings; and Q includes at least one nitrogen atom and, together with a carbon atom to be combined, represents an atom group which is required to form a nitrogen-containing heterocyclic ring having a five-membered ring or more.

2. An ink-jet ink according to claim 1, wherein said oil-soluble dye which is represented in the formula (I) is an oil-soluble dye which is represented in the following formula (II):

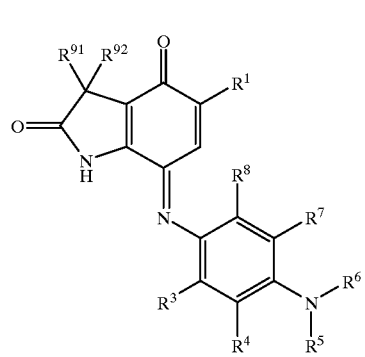

Formula (II)

wherein, $R^1$, $R^3$, $R^4$, $R^5$, $R^6$, $R^7$, and $R^8$ are respectively synonymous with $R^1$, $R^3$, $R^4$, $R^5$, $R^6$, $R^7$, and $R^8$ in the above formula (I);

$R^{91}$ and $R^{92}$ represent respectively independently one of a hydrogen atom, a halogen atom, an aliphatic group, an aromatic group, a heterocyclic group, a cyano group, $-OR^{101}$, $-SR^{102}$, $-CO_2R^{103}$, $-OCOR^{104}$, $-NR^{105}R^{106}$, $-CONR^{107}R^{108}$, $-SO_2R^{109}$, $-SO_2NR^{110}R^{111}$, $-NR^{112}CONR^{113}R^{114}$, $-NR^{115}CO_2R^{116}$, $-COR^{117}$, $-NR^{118}COR^{119}$, and $NR^{120}SO_2R^{121}$;

$R^{101}$, $R^{102}$, $R^{103}$, $R^{104}$, $R^{105}$, $R^{106}$, $R^{107}$, $R^{108}$, $R^{109}$, $R^{110}$, $R^{111}$, $R^{112}$, $R^{113}$, $R^{114}$, $R^{115}$, $R^{116}$, $R^{117}$, $R^{118}$, $R^{119}$, $R^{120}$, and $R^{121}$ represent respectively independently one of a hydrogen atom, an aliphatic group, and an aromatic group; and $R^{91}$ and $R^{92}$ may be combined with each other and form a ring.

3. An ink-jet ink according to claim 1, wherein said oil-soluble dye which is represented in the formula (I) is an oil-soluble dye which is represented in the following formula (III):

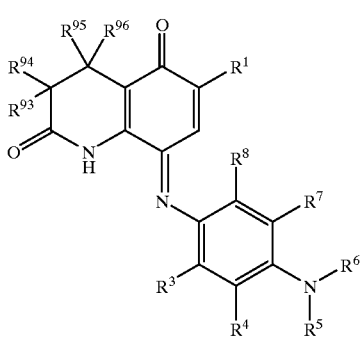

Formula (III)

wherein, $R^1$, $R^3$, $R^4$, $R^5$, $R^6$, $R^7$, and $R^8$ are respectively synonymous with $R^1$, $R^3$, $R^4$, $R^5$, $R^6$, $R^7$, and $R^8$ in the above formula (I);

$R^{93}$, $R^{94}$, $R^{95}$, and $R^{96}$ represent respectively independently one of a hydrogen atom, a halogen atom, an aliphatic group, an aromatic group, a heterocyclic group, a cyano group, —OR$^{101}$, —SR$^{102}$, —CO$_2$R$^{103}$, OCOR$^{104}$, —NR$^{105}$R$^{106}$, —CONR$^{107}$R$^{108}$, —SO$_2$R$^{109}$, —SO$_2$NR$^{110}$R$^{111}$, —NR$^{112}$CONR$^{113}$R$^{114}$, —NR$^{115}$CO$_2$R$^{116}$, —COR$^{117}$, —NR$^{118}$CR$^{119}$, and NR$^{120}$SO$_2$R$^{121}$;

R$^{101}$, R$^{102}$, R$^{103}$, R$^{104}$, R$^{105}$, R$^{106}$, R$^{107}$, R$^{108}$, R$^{109}$, R$^{110}$, R$^{111}$, R$^{112}$, R$^{113}$, R$^{114}$, R$^{115}$, R$^{116}$, R$^{117}$, R$^{118}$, R$^{119}$, R$^{120}$, and R$^{121}$ represent respectively independently one of a hydrogen atom, an aliphatic group, and an aromatic group; and R$^{93}$ and R$^{94}$, R$^{94}$ and R$^{95}$, and R$^{95}$ and R$^{96}$ may be combined with each other and form rings.

4. An ink-jet ink according to claim 1, wherein said oil-soluble dye which is represented in the formula (I) is dispersed in a water-based medium.

5. An ink-jet ink according to claim 4, wherein said oil-soluble dye is represented in the formula (I) and is dissolved in a high boiling point organic solvent which has a boiling point of 150° C. or more and has a specific inductive capacity at 25° C. of 3 to 12, and said oil-soluble dye is dispersed in the water-based medium.

6. An ink-jet ink according to claim 4, wherein coloring particulates, which contain said oil-soluble dye which is represented in the formula (I) and an oil-soluble polymer, are dispersed in the water-based medium.

7. An ink-jet ink according to claim 6, wherein content of said oil-soluble polymer in the coloring composition is from 10 to 1000 mass parts, relative to 100 mass parts of the oil-soluble dye.

8. An ink-jet ink according to claim 6, wherein said coloring composition includes a high boiling point organic solvent.

9. An ink-jet ink according to claim 8, wherein content of said high boiling point organic solvent in the coloring composition is from 1 to 1000 mass parts, relative to 100 mass parts of the oil-soluble dye.

10. An ink-jet ink according to claim 6, wherein in the coloring particulates, said oil-soluble dye is dispersed in the oil-soluble polymer.

11. A coloring composition which contains an oil-soluble dye which is represented in the following formula (I):

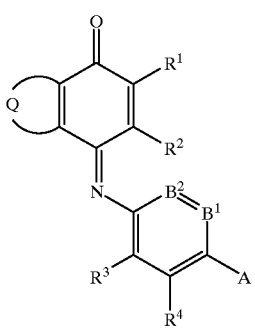

Formula (I)

wherein, R$^1$ and R$^2$ represent respectively independently one of a hydrogen atom, a halogen atom, an aliphatic group, an aromatic group, a heterocyclic group, a cyano group, —OR$^{11}$, —SR$^{12}$, —CO$_2$R$^{13}$, —OCOR$^{14}$, —NR$^{15}$R$^{16}$, —CONR$^{17}$R$^{18}$, —SO$_2$R$^{19}$, —SO$_2$NR$^{20}$R$^{21}$, —NR$^{22}$CONR$^{23}$R$^{24}$, —NR$^{25}$CO$_2$R$^{26}$, —COR$^{27}$, —NR$^{28}$COR$^{29}$, and NR$^{30}$SO$_2$R$^{31}$;

R$^{11}$, R$^{12}$, R$^{13}$, R$^{14}$, R$^{15}$, R$^{16}$, R$^{17}$, R$^{18}$, R$^{19}$, R$^{20}$, R$^{21}$R$^{22}$, R$^{23}$, R$^{24}$, R$^{25}$, R$^{26}$, R$^{27}$, R$^{28}$, R$^{29}$, R$^{30}$, and R$^{31}$ represent respectively independently one of a hydrogen atom, an aliphatic group, and an aromatic group;

R$^1$ and R$^2$ may be connected to each other and form a ring;

A represents one of —NR$^5$R$^6$ and a hydroxyl group;

R$^5$ and R$^6$ represent respectively independently one of a hydrogen atom, an aliphatic group, an aromatic group, and a heterocyclic group;

B$^1$ represents one of =C(R$^7$)— and =N— and B$^2$ represents one of —C(R$^8$)= and —N=;

R$^3$, R$^4$, R$^7$, and R$^8$ represent respectively independently one of a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, —SO$_2$NR$^{60}$R$^{61}$, —NR$^{62}$CONR$^{63}$R$^{64}$, —NR$^{65}$CO$_2$R$^{66}$, —COR$^{67}$, —NR$^{68}$COR$^{69}$, and NR$^{70}$SO$_2$R$^{71}$;

R$^{51}$, R$^{52}$, R$^{53}$, R$^{54}$, R$^{55}$, R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$, R$^{68}$, R$^{69}$, R$^{70}$, and R$^{71}$ represent respectively independently one of a hydrogen atom, an aliphatic group, and an aromatic group;

R$^3$ and R$^4$, R$^4$ and R$^5$, R$^5$ and R$^6$, R$^6$ and R$^7$, and R$^7$ and R$^8$ may be combined with each other and form rings; and Q includes at least one nitrogen atom and, together with a carbon atom to be combined, represents an atom group which is required to form a nitrogen-containing heterocyclic ring having a five-membered ring or more.

12. A coloring composition according to claim 11, wherein said coloring composition is used for an ink composition.

13. An ink jet recording method in which recording is carried out using an ink-jet ink, said ink-jet ink includes a coloring composition which contains an oil-soluble dye represented in the following formula (I):

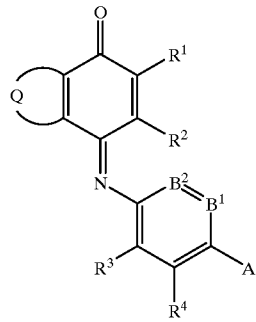

Formula (I)

wherein, R$^1$ and R$^2$ represent respectively independently one of a hydrogen atom, a halogen atom, an aliphatic group, an aromatic group, a heterocyclic group, a cyano group, —OR$^{11}$, —SR$^{12}$, —CO$_2$R$^{13}$, —OCOR$^{14}$, —NR$^{15}$R$^{16}$, —CONR$^{17}$R$^{18}$, —SO$_2$R$^{19}$, —SO$_2$NR$^{20}$R$^{21}$, —NR$^{22}$CONR$^{23}$R$^{24}$, —NR$^{25}$CO$_2$R$^{26}$, —COR$^{27}$, —NR$^{28}$COR$^{29}$, and NR$^{30}$SO$_2$R$^{31}$;

R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, R$^{30}$, and R$^{31}$ represent respectively independently one of a hydrogen atom, an aliphatic group, and an aromatic group;

R$^1$ and R$^2$ may be connected to each other and form a ring;

A represents one of —NR$^5$R$^6$ and a hydroxyl group;

$R^5$ and $R^6$ represent respectively independently one of a hydrogen atom, an aliphatic group, an aromatic group, and a heterocyclic group;

$B^1$ represents one of =C($R^7$)— and =N— and $B^2$ represents one of —C($R^8$)= and —N=;

$R^3$, $R^4$, $R^5$, and $R^8$ represent respectively independently one of a hydrogen atom, a halogen atom, an aliphatic group, an aromatic group, a heterocyclic group, a cyano group, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, and $NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently one of a hydrogen atom, an aliphatic group, and an aromatic group;

$R^3$ and $R^4$, $R^4$ and $R^5$, $R^5$ and $R^6$, $R^6$ and $R^7$, and $R^7$ and $R^8$ may be combined with each other and form rings; and Q includes at least one nitrogen atom and, together with a carbon atom to be combined, represents an atom group which is required to form a nitrogen-containing heterocyclic ring having a five-membered ring or more.

14. An ink jet recording method according to claim 13, wherein said oil-soluble dye which is represented in the formula (I) is an oil-soluble dye which is represented in the following formula (II):

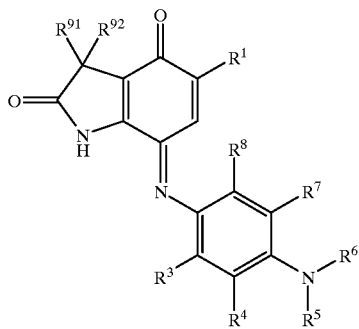

Formula (II)

wherein, $R^1$, $R^3$, $R^4$, $R^5$, $R^6$, $R^7$, and $R^8$ are respectively synonymous with $R^1$, $R^3$, $R^4$, $R^5$, $R^6$, $R^7$, and $R^8$ in the above formula (I);

$R^{91}$ and $R^{92}$ represent respectively independently one of a hydrogen atom, a halogen atom, an aliphatic group, an aromatic group, a heterocyclic group, a cyano group, —$OR^{101}$, —$SR^{102}$, —$CO_2R^{103}$, —$OCOR^{104}$, —$NR^{105}R^{106}$, —$CONR^{107}R^{108}$, —$SO_2R^{109}$, —$SO_2NR^{110}R^{111}$, —$NR^{112}CONR^{113}R^{114}$, —$NR^{115}CO_2R^{116}$, —$COR^{117}$, —$NR^{118}COR^{119}$, and $NR^{120}SO_2R^{121}$;

$R^{101}$, $R^{102}$, $R^{103}$, $R^{104}$, $R^{105}$, $R^{106}$, $R^{107}$, $R^{108}$, $R^{109}$, $R^{110}$, $R^{111}$, $R^{112}$, $R^{113}$, $R^{114}$, $R^{115}$, $R^{116}$, $R^{117}$, $R^{118}$, $R^{119}$, $R^{120}$, and $R^{121}$ represent respectively independently one of a hydrogen atom, an aliphatic group, and an aromatic group; and $R^{91}$ and $R^{92}$ may be combined with each other and form a ring.

15. An ink jet recording method according to claim 13, wherein said oil-soluble dye which is represented in the formula (I) is an oil-soluble dye which is represented in the following formula (III):

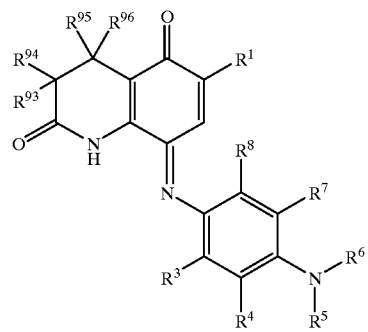

Formula (III)

wherein, $R^1$, $R^3$, $R^4$, $R^5$, $R^6$, $R^7$, and $R^8$ are respectively synonymous with $R^1$, $R^3$, $R^4$, $R^5$, $R^6$, $R^7$, and $R^8$ in the above formula (I);

$R^{93}$, $R^{94}$, $R^{95}$, and $R^{96}$ represent respectively independently one of a hydrogen atom, a halogen atom, an aliphatic group, an aromatic group, a heterocyclic group, a cyano group, —$OR^{101}$, —$SR^{102}$, —$CO_2R^{103}$, —$OCOR^{104}$, —$NR^{105}R^{106}$, —$CONR^{107}R^{108}$, —$SO_2R^{109}$, —$SO_2NR^{110}R^{111}$, —$NR^{112}CONR^{113}R^{114}$, —$NR^{115}CO_2R^{116}$, —$COR^{117}$, —$NR^{118}COR^{119}$, and $NR^{120}SO_2R^{121}$;

$R^{101}$, $R^{102}$, $R^{103}$, $R^{104}$, $R^{105}$, $R^{106}$, $R^{107}$, $R^{108}$, $R^{109}$, $R^{110}$, $R^{111}$, $R^{112}$, $R^{113}$, $R^{114}$, $R^{115}$, $R^{116}$, $R^{117}$, $R^{118}$, $R^{119}$, $R^{120}$, and $R^{121}$ represent respectively independently one of a hydrogen atom, an aliphatic group, and an aromatic group; and $R^{93}$ and $R^{94}$, $R^{94}$ and $R^{95}$, and $R^{95}$ and $R^{96}$ may be combined with each other and form rings.

16. An ink jet recording method according to claim 13, wherein said oil-soluble dye which is represented in the formula (I) is dispersed in a water-based medium.

17. An ink jet recording method according to claim 16, wherein said oil-soluble dye is represented in the formula (I) and is dissolved in a high boiling point organic solvent which has a boiling point of 150° C. or more and has a specific inductive capacity at 25° C. of 3 to 12, and said oil-soluble dye is dispersed in the water-based medium.

18. An ink jet recording method according to claim 16, wherein coloring particulates, which contain said oil-soluble dye which is represented in the formula (I) and an oil-soluble polymer, are dispersed in the water-based medium.

19. An ink jet recording method according to claim 18, wherein said coloring composition includes a high boiling point organic solvent.

20. An ink jet recording method according to claim 18, wherein in the coloring particulates, said oil-soluble dye is dispersed in the oil-soluble polymer.

* * * * *